United States Patent
Adkins

(10) Patent No.: US 12,527,957 B2
(45) Date of Patent: Jan. 20, 2026

(54) AUTOMATIC GAIN CONTROL ALGORITHM FOR HEARTBEAT DETECTION

(71) Applicant: LivaNova USA, Inc., Houston, TX (US)

(72) Inventor: Robert Alan Adkins, Angleton, TX (US)

(73) Assignee: LivaNova USA, Inc., Houston, TX (US)

( * ) Notice: Subject to any disclaimer, the term of this patent is extended or adjusted under 35 U.S.C. 154(b) by 803 days.

(21) Appl. No.: 17/471,644

(22) Filed: Sep. 10, 2021

(65) Prior Publication Data

US 2023/0085110 A1    Mar. 16, 2023

(51) Int. Cl.
  *A61N 1/36*    (2006.01)
  *A61N 1/02*    (2006.01)

(52) U.S. Cl.
  CPC ......... *A61N 1/36139* (2013.01); *A61N 1/025* (2013.01)

(58) Field of Classification Search
  CPC ........................... A61N 1/36139; A61N 1/025
  USPC .......................................................... 607/62
  See application file for complete search history.

(56) References Cited

U.S. PATENT DOCUMENTS

| 5,103,819 A * | 4/1992 | Baker ...................... A61N 1/37 |
| --- | --- | --- |
| | | 607/9 |
| 5,957,857 A * | 9/1999 | Hartley ................ A61B 5/7203 |
| | | 607/9 |
| 2008/0109041 A1* | 5/2008 | de Voir .................... A61N 1/37 |
| | | 607/7 |
| 2021/0046320 A1* | 2/2021 | Tan ........................ H03G 3/002 |

FOREIGN PATENT DOCUMENTS

WO    WO-99/21612 A1    5/1999

OTHER PUBLICATIONS

International Search Report and Written Opinion on PCT Appl. Ser. No. PCT/US2022/042739 dated Jan. 4, 2023 (12 pages).

* cited by examiner

*Primary Examiner* — Carl H Layno
*Assistant Examiner* — Maria Catherine Anthony
(74) *Attorney, Agent, or Firm* — Foley & Lardner LLP

(57) ABSTRACT

An implantable medical device comprises a control circuit and a memory. The memory is operably coupled to the control circuit. The memory comprises instructions that, when executed by the control circuit, cause the control circuit to monitor an output of at least one comparator, the output of the at least one comparator being responsive to a cardiac signal of a patient. The instructions further cause the control circuit to automatically adjust a gain level applied to the cardiac signal over time based on the monitored output of the at least one comparator.

20 Claims, 14 Drawing Sheets

FIG. 15

AUTOMATIC GAIN CONTROL ALGORITHM FOR HEARTBEAT DETECTION

BACKGROUND

Heartbeat detection is utilized as a feedback mechanism for controlling a variety of monitoring and therapeutic treatment processes. In these instances, inaccurate heartbeat detection may result in poor monitoring capabilities and/or reduced treatment efficacy. Accordingly, accurate heartbeat detection provides a variety of benefits. When detecting a patient's heartbeat, a physician typically manually selects a static gain level to be applied to the patient's cardiac signal.

SUMMARY

In accordance with embodiments of the present invention, an implantable medical device is provided. The implantable medical device comprises a control circuit and a memory. The memory is operably coupled to the control circuit and comprises instructions that, when executed by the control circuit, cause the control circuit to monitor an output of at least one comparator, the output of the at least one comparator being responsive to a cardiac signal of a patient. The instructions further cause the control circuit to automatically adjust a gain level applied to the cardiac signal over time based on the monitored output of the at least one comparator.

In accordance with other embodiments of the present invention, a method of operating an implantable medical device is provided. The method comprises monitoring an output of at least one comparator, the output of the at least one comparator being responsive to a cardiac signal of a patient. The method further comprises automatically adjusting a gain level applied to the cardiac signal over time based on the monitored output of the at least one comparator.

In accordance with other embodiments of the present invention, a non-transitory computer-readable medium comprising instructions executable by a processor is provided. The instructions are executable by the processor to monitor an output of at least one comparator, the output of the at least one comparator being responsive to a cardiac signal of a patient. The instructions are further executable by the processor to automatically adjust a gain level applied to the cardiac signal over time based on the monitored output of the at least one comparator.

BRIEF DESCRIPTION OF DRAWINGS

Further features, characteristics, and advantages of the present disclosure will become apparent to a person of ordinary skill in the art from the following detailed description of embodiments of the present disclosure, made with reference to the drawings annexed, in which like reference characters refer to like elements.

FIG. 15 is a chart depicting heartbeat detections at various R-wave amplitudes and gain levels, according to an exemplary embodiment.

DETAILED DESCRIPTION

Figure 2B:
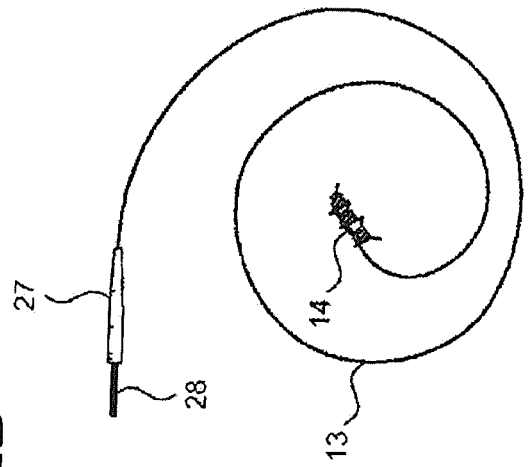
FIGS. 2A and 2B are diagrams respectively showing the implantable neurostimulator and the simulation therapy lead of FIG. 1, according to exemplary embodiments.

Implantable medical devices may utilize heartbeat detection to monitor and/or provide a feedback mechanism for a variety of treatment therapies. For example, in some instances, while treating drug-refractory epilepsy using an implantable neurostimulation device, heartbeat detection may be utilized to identify the onset of a seizure event. In these instances, a sudden increase in the patient's heart rate may indicate the onset of a seizure event. Accordingly, upon detecting the sudden increase in the patient's heart rate, therapeutic stimulation may be responsively applied to the patient to counteract the seizure or prevent the patient from having a seizure at all.

In some other instances, heartbeat detection may be utilized as a feedback mechanism while delivering therapeutic neurostimulation for treating chronic heart failure. For example, in these instances, the patient's heart rate may be used as an indicator of autonomic engagement 5b during treatment to improve the therapeutic effectiveness of the neurostimulation treatment.

In either of these cases, as well as in a variety of other treatments or patient monitoring processes generally, inaccurate heartbeat detection may result in reduced therapeutic efficacy and/or poor patient monitoring capabilities.

The systems and methods described herein provide an automatic gain control (AGC) algorithm for automatically adjusting a gain level applied to a cardiac signal for accurate detection of a patient's heartbeats. The AGC algorithm provides a variety of technical benefits over traditional gain setting strategies and techniques in the context of detecting patient heart beats. Although the AGC algorithm may be utilized in a variety of settings, it may be particularly useful for utilization by implantable medical devices configured to detect patient heart beats.

For example, traditionally, prior to implantation and/or providing treatment via an implantable medical device, a physician is required to manually set a gain level to be applied to the cardiac signal. This manual process is often cumbersome and involves the physician monitoring an electrocardiogram (EKG) of the patient and making sure that the selected gain level is providing a sufficiently accurate detection of the patient's heart beats. Conversely, the AGC algorithm described herein allows for the omission of this manual process by automatically adjusting the gain level to an appropriate level, thereby reducing an implantation and/or set up time associated with the medical device. Specifically, the AGC algorithm utilizes a comparator output (e.g., a number of comparator trips caused by the cardiac signal of the patient) to selectively increase or decrease the gain level applied to the cardiac signal.

In addition to allowing for the omission of the manual process discussed above, the AGC algorithm further allows for continual adjustment of the gain level applied to the cardiac signal in response to changing cardiac signal amplitudes of the patient. For example, traditionally, the gain level selected by the physician is a static gain level. That is, once the physician sets the gain level, the gain level remains constant until the physician manually changes it again. However, the patient's cardiac signal amplitude may raise or lower for a variety of reasons. For example, in some instances, the patient's cardiac signal may change based on the patient's body position, the patient's activity level, the patient's sleep state, or due to a variety of other physiological events. Accordingly, in these instances, the static gain level set by the physician while initializing the cardiac signal detection parameters may become less accurate (e.g., begin to under-sense or over-sense the patient's heartbeat) once the patient's cardiac signal amplitude has changed. In some instances, over-sensing may result in unnecessary stimulation, which may drain the battery of the medical device. On the other hand, the AGC algorithm described herein allows for continual adjustment of the gain level, thereby allowing for an appropriate gain level to be continuously applied to the cardiac signal, even as the patient's cardiac signal amplitude changes.

Further, in some embodiments, the AGC algorithm described herein is configured to operate solely based on the output of one or more comparators receiving an analog cardiac signal. Accordingly, the AGC algorithm described herein eliminates the need for analog-to-digital (A/D) conversion of the cardiac signal, thereby reducing the computational requirements placed on the associated medical device while processing the cardiac signal, as well as the overall power consumption associated with processing the cardiac signal. That is, medical device utilizing an A/D conversion of the cardiac signal need to constantly sample the cardiac signal to accurately process the cardiac signal. This constant sampling is computationally intensive and thus increases the overall power consumption associated with processing the cardiac signal. Accordingly, by utilizing the comparator output instead of an A/D conversion to automatically adjust the gain levels, the AGC algorithm allows for effective adjustment of the gain level applied to the cardiac signal to ensure accurate heartbeat detection, while eliminating the more intensive computational requirements associated with A/D conversion.

Additionally, because the AGC algorithm is configured to function based on the output of the one or more comparators receiving the analog cardiac signal, the AGC algorithm is feedback-driven based on the cardiac signal itself. This feedback-driven gain control improves the accuracy of the adjustments made to the gain level during operation, as compared to various other gain control methods. For example, in some other potential algorithms, various predictive methods for adjusting the gain level applied to the cardiac signal may be employed. Specifically, in some other potential algorithms, a predicted R-R wave period may be utilized to estimate when each subsequent R-wave will be detected. In these gain control methods, the associated medical device may determine whether the gain level is too low or too high at a given point in time based on a comparison between the estimated R-wave timeframe and the time the R-wave is actually detected.

However, this type of predictive method for adjusting the gain level may be prone to inaccurate or otherwise inappropriate gain level changes. For example, because the predicted R-R wave period is predicted instead of being feedback-driven based on the cardiac signal itself, sudden changes in heart rate (and thus the R-R wave time period) may result in inaccurate or unnecessary gain level changes. Conversely, the AGC algorithm described herein avoids these inaccurate or unnecessary gain level changes by utilizing the cardiac signal itself to trigger gain level changes during operation.

To illustrate the benefits of the AGC algorithm discussed above, exemplary implantable medical devices and systems will be described below. However, it should be appreciated that the AGC algorithm may be used in a variety of applications for monitoring heart rate, and the following implantable medical devices and systems are in no way meant to be limiting. For example, the illustrated medical devices and systems comprise vagus nerve stimulation (VNS) systems configured to apply therapeutic VNS to the patient for the treatment of epilepsy and/or chronic heart failure. It will be appreciated that the AGC algorithm could be utilized in other types of stimulation systems (e.g., hypoglossal nerve stimulation, cortical stimulation, spinal cord stimulation) to provide various other treatments and/or monitoring capabilities, as desired for a given application.

Figure 1:
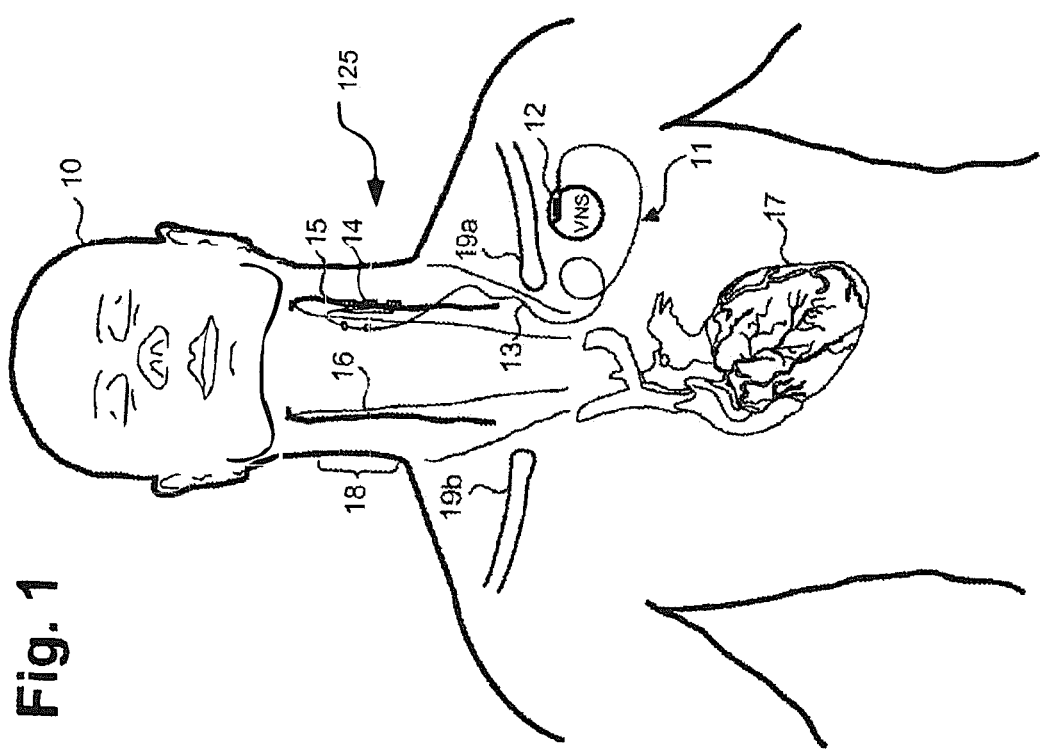
FIG. 1 is a front anatomical diagram showing, by way of example, placement of an implantable vagus stimulation device in a male patient, according to an exemplary embodiment.

FIG. 1 is a front anatomical diagram showing, by way of example, placement of an implantable medical device (e.g., a vagus nerve stimulation (VNS) system 11, as shown in FIG. 1) in a male patient 10, in accordance with embodiments of the present invention. The implantable medical device may be utilized to selectively provide VNS to treat a variety of patient conditions including, but not limited to, drug-refractory epilepsy and chronic heart failure.

The implantable vagus stimulation system 11 comprises an implantable neurostimulator or pulse generator 12 and a stimulating nerve electrode assembly 125. The stimulating nerve electrode assembly 125, preferably comprising at least an electrode pair, is conductively connected to the distal end of an insulated, electrically conductive lead assembly 13 and comprises electrodes 14. The electrodes 14 may be provided in a variety of forms, such as, e.g., helical electrodes, probe electrodes, cuff electrodes, as well as other types of electrodes. The implantable vagus stimulation system 11 can be remotely accessed following implant through an external programmer, such as the programmer 40 shown in FIG. 3 and described in further detail below. The programmer 40 can be used by healthcare professionals to check and program the neurostimulator 12 after implantation in the patient 10. For further example, an external programmer may communicate with the neurostimulation system 11 via other wired or wireless communication methods, such as, e.g., wireless RF transmission. Together, the implantable vagus stimulation system 11 and one or more of the external components form a VNS therapeutic delivery system.

The neurostimulator 12 is typically implanted in the patient's right or left pectoral region generally on the same side (ipsilateral) as the vagus nerve 15, 16 to be stimulated, although other neurostimulator-vagus nerve configurations, including contra-lateral and bi-lateral are possible. A vagus nerve typically comprises two branches that extend from the brain stem respectively down the left side and right side of the patient, as seen in FIG. 1. The electrodes 14 are generally implanted on the vagus nerve 15, 16 about halfway between the clavicle 19a-b and the mastoid process. The electrodes may be implanted on either the left or right side. The lead assembly 13 and electrodes 14 are implanted by first exposing the carotid sheath and chosen branch of the vagus nerve 15, 16 through a latero-cervical incision (perpendicular to the long axis of the spine) on the ipsilateral side of the patient's neck 18. The helical electrodes 14 are then placed onto the exposed nerve sheath and tethered. A subcutaneous tunnel is formed between the respective implantation sites of the neurostimulator 12 and helical electrodes 14, through which the lead assembly 13 is guided to the neurostimulator 12 and securely connected.

Figure 2A:
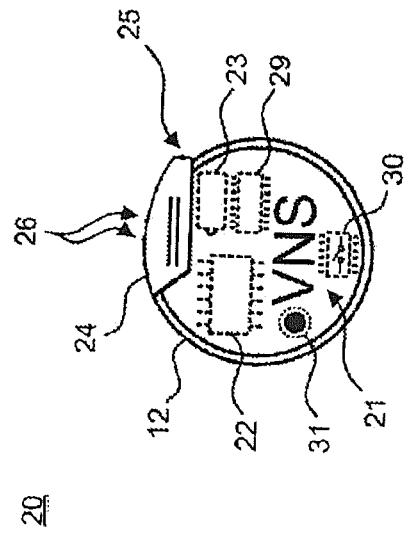

The VNS therapy may be delivered autonomously to the patient's vagus nerve 15, 16 through three implanted components that include a neurostimulator 12, lead assembly 13, and electrodes 14. FIGS. 2A and 2B are diagrams respectively showing the implantable neurostimulator 12 and the stimulation lead assembly 13 of FIG. 1. The stimulation lead assembly 13 and electrodes 14 are generally fabricated as a combined assembly in two sizes based, for example, on a helical electrode inner diameter, although other types of single-pin receptacle-compatible therapy leads and electrodes could also be used.

Referring first to FIG. 2A, the neurostimulator 12 of the system 20 includes an electrical pulse generator that may be tuned to provide therapeutic stimulation therapy (e.g., for the treatment of drug-refractory epilepsy and/or to improve autonomic regulatory function by triggering action potentials that propagate both afferently and efferently within the vagus nerve 15, 16). The neurostimulator 12 is enclosed in a hermetically sealed housing 21 constructed of a biocompatible material, such as titanium. The housing 21 contains a processing unit 22 powered by a battery 23, such as a lithium carbon monofluoride primary battery or a rechargeable secondary cell battery.

In some instances, the processing unit 22 may be implemented using complementary metal oxide semiconductor integrated circuits that include a microprocessor controller that executes a control program according to stored instructions (e.g., stimulation parameters, timing cycles). In some instances, the processing unit 22 may further include a voltage regulator that regulates system power. The processing unit 22 may further include logic and control circuitry, which may be in communication with a recordable memory 29 within which the instructions are stored. The recordable memory 29 can include both volatile (dynamic) and non-volatile/persistent (static) forms of memory, such as firmware within which the stimulation parameters and timing cycles can be stored. Although shown separately in FIG. 2A, in some instances, the processing unit 22 may additionally include the memory 29, such that the processing unit 22 and the memory 29 are a solitary component. In either case, the processing unit 22 and/or the memory 29 are configured to control overall functionality of the neurostimulator 12, receive and implement programming commands from the external programmer, or other external source, collect and store telemetry information, process sensory input, and control scheduled and sensory-based therapy outputs.

The processing unit 22 may further include a transceiver that remotely communicates with the external programmer using radio frequency signals; an antenna, which receives programming instructions and transmits the telemetry information to the external programmer; and a reed switch 30 that provides remote access to the operation of the neurostimulator 12 using an external programmer, a simple patient magnet, or an electromagnetic controller. Other electronic circuitry and components are possible.

The neurostimulator 12 includes a header 24 to securely receive and connect to the lead assembly 13. In one embodiment, the header 24 encloses a receptacle 25 into which a single pin for the lead assembly 13 can be received, although two or more receptacles could also be provided, along with the corresponding electronic circuitry associated with the processing unit 22. In some instances, the header 24 may internally include a lead connector block (not shown) and a set of screws 26. In some other instances, the header 24 may include a single set screw and a canted spring configured to collectively receive the single pin for the lead assembly 13.

In some embodiments, the neurostimulator 12 is configured to obtain an analog cardiac signal from the patient. Specifically, the analog cardiac signal may be obtained by a front-end sensing configuration 31 that determines a voltage difference between any of the various electrodes 14 of the lead assembly 13 and/or the housing 21. For example, in some instances the housing 21 may be configured to detect a reference voltage that is the then compared to a voltage potential at one of the electrodes 14 of the lead assembly 13 to determine a voltage difference indicative of the patient's cardiac signal. The front-end sensing configuration 31 is then configured to amplify and filter the detected signal, to apply the amplified and filtered signal to a comparator, and to output a comparator signal to the processing unit 22 based on the analog cardiac signal, as will be described in further detail below, with reference to FIG. 8.

Referring next to FIG. 2B, the lead assembly 13 is further configured to deliver an electrical signal from the neurostimulator 12 to the vagus nerve 15, 16 via one or more of the electrodes 14. On a proximal end, the lead assembly 13 has a lead connector 27 that transitions an insulated electrical lead body to a metal connector pin 28. During implantation, the connector pin 28 is guided through the receptacle 25 into the header 24 and securely fastened in place using the setscrews 26 to electrically couple the lead assembly 13 to the neurostimulator 12. On a distal end, the lead assembly 13 terminates with the electrodes 14, which bifurcates into a pair of anodic and cathodic electrodes 62 (as further described infra with reference to FIG. 4). In one embodiment, the lead connector 27 is manufactured using silicone and the connector pin 28 is made of stainless steel, although other suitable materials could be used, as well. The insulated lead body 13 utilizes a silicone-insulated alloy conductor material.

In some embodiments, the electrodes 14 are helical and placed around the cervical vagus nerve 15, 16 at the location below where the superior and inferior cardiac branches separate from the cervical vagus nerve. In alternative embodiments, the helical electrodes may be placed at a location above where one or both of the superior and inferior cardiac branches separate from the cervical vagus nerve. In one embodiment, the helical electrodes 14 are positioned around the patient's vagus nerve oriented with the end of the helical electrodes 14 facing the patient's head. In an alternate embodiment, the helical electrodes 14 are positioned around the patient's vagus nerve 15, 16 oriented with the end of the helical electrodes 14 facing the patient's heart 17. At the distal end, the insulated electrical lead body 13 is bifurcated into a pair of lead bodies that are connected to a pair of electrodes. The polarity of the electrodes could be configured into a monopolar cathode, a proximal anode and a distal cathode, or a proximal cathode and a distal anode.

Figure 3:
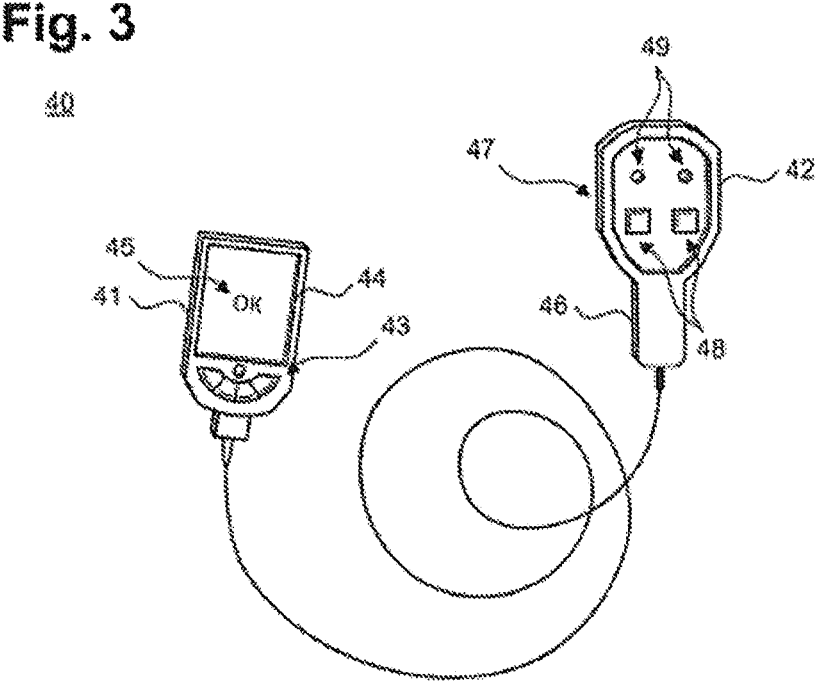
FIG. 3 is a diagram showing an external programmer for use with the implantable neurostimulator of FIG. 1, according to an exemplary embodiment.

The neurostimulator 12 may be interrogated prior to implantation and throughout the therapeutic period with a healthcare provider-operable control system comprising an external programmer and programming wand (shown in FIG. 3) for checking proper operation, downloading recorded data, diagnosing problems, and programming operational parameters. FIG. 3 is a diagram showing an external programmer 40 for use with the implantable neurostimulator 12 of FIG. 1. The external programmer 40 includes a healthcare provider operable programming computer 41 and a programming wand 42. Generally, use of the external programmer is restricted to healthcare providers, while more limited manual control may be provided to the patient through a "magnet mode."

In one embodiment, the external programmer 40 executes application software 45 specifically designed to interrogate the neurostimulator 12. The programming computer 41 interfaces to the programming wand 42 through a wired or wireless data connection. Other configurations and combinations of external programmer 40, programming wand 42, and application software 45 are possible.

The programming computer 41 can be implemented using a general purpose programmable computer and can be a personal computer, laptop computer, ultrabook computer, netbook computer, handheld computer, tablet computer, smartphone, or other form of computational device. The programming computer 41 functions through those components conventionally found in such devices, including, for instance, a central processing unit, volatile and persistent memory, touch-sensitive display, control buttons, peripheral input and output ports, and network interface. The computer 41 operates under the control of the application software 45, which is executed as program code as a series of process or method modules or steps by the programmed computer hardware. Other assemblages or configurations of computer hardware, firmware, and software are possible.

Operationally, the programming computer 41, when connected to a neurostimulator 12 through wireless telemetry using the programming wand 42, can be used by a healthcare provider to remotely interrogate the neurostimulator 12 and modify stored stimulation parameters. The programming wand 42 provides data conversion between the digital data accepted by and output from the programming computer 41 and the radio frequency signal format that is required for communication with the neurostimulator 12. The programming computer 41 may further be configured to receive inputs, such as physiological signals received from patient sensors (e.g., implanted or external). These sensors may be configured to monitor one or more physiological signals, e.g., vital signs, such as body temperature, pulse rate, respiration rate, blood pressure, etc. These sensors may be coupled directly to the programming computer 41 or may be coupled to another instrument or computing device that receives the sensor input and transmits the input to the programming computer 41. The programming computer 41 may monitor, record, and/or respond to the physiological signals in order to effectuate stimulation delivery in accordance with embodiments of the present invention.

The healthcare provider operates the programming computer 41 through a user interface that includes a set of input controls 43 and a visual display 44, which could be touch-sensitive, upon which to monitor progress, view downloaded telemetry and recorded physiology, and review and modify programmable stimulation parameters. The telemetry can include reports on device history that provide patient identifier, implant date, model number, serial number, magnet activations, total ON time, total operating time, manufacturing date, and device settings and stimulation statistics, and reports on device diagnostics that include patient identifier, model identifier, serial number, firmware build number, implant date, communication status, output current status, measured current delivered, lead impedance, and battery status. Other kinds of telemetry or telemetry reports are possible.

During interrogation, the programming wand 42 is held by its handle 46, and the bottom surface 47 of the programming wand 42 is placed on the patient's chest over the location of the implanted neurostimulator 12. A set of indicator lights 49 can assist with proper positioning of the wand, and a set of input controls 48 enables the programming wand 42 to be operated directly, rather than requiring the healthcare provider to awkwardly coordinate physical wand manipulation with control inputs via the programming computer 41. The sending of programming instructions and receipt of telemetry information occur wirelessly through radio frequency signal interfacing. Other programming computer and programming wand operations are possible.

Figure 4:
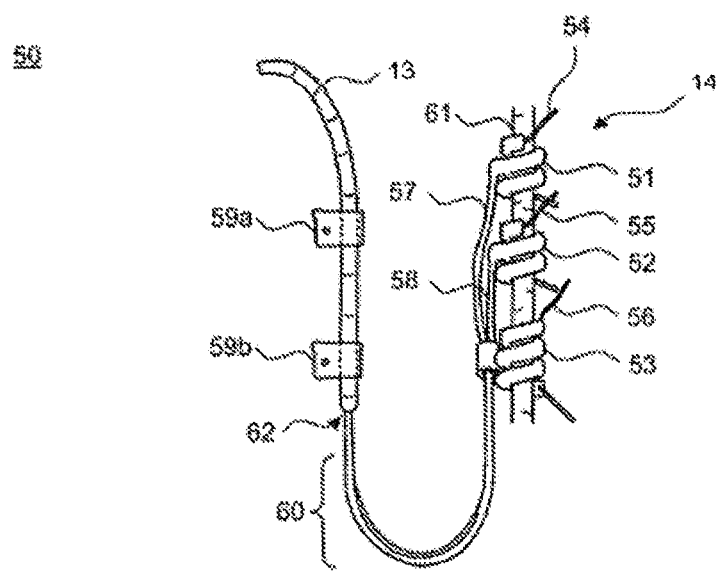
FIG. 4 is a diagram showing electrodes provided as on the stimulation therapy lead of FIG. 2 in place on a vagus nerve in situ, according to an exemplary embodiment.

Preferably, the electrodes 14 are helical and placed on the cervical vagus nerve 15, 16 at the location below where the superior and inferior cardiac branches separate from the cervical vagus nerve. FIG. 4 is a diagram showing the helical electrodes 14 provided as on the stimulation lead assembly 13 of FIG. 2 in place on a vagus nerve 15, 16 in situ 50. Although described with reference to a specific manner and orientation of implantation, the specific surgical approach and implantation site selection particulars may vary, depending upon physician discretion and patient physical structure.

Under one embodiment, helical electrodes 14 may be positioned on the patient's vagus nerve 61 oriented with the end of the helical electrodes 14 facing the patient's head. At the distal end, the insulated electrical lead body 13 is bifurcated into a pair of lead bodies 57, 58 that are connected to a pair of electrodes 51, 52. The polarity of the electrodes 51, 52 could be configured into a monopolar cathode, a proximal anode and a distal cathode, or a proximal cathode and a distal anode. In addition, an anchor tether 53 is fastened over the lead bodies 57, 58 that maintains the position of the helical electrodes on the vagus nerve 61 following implant. In one embodiment, the conductors of the electrodes 51, 52 are manufactured using a platinum and iridium alloy, while the helical materials of the electrodes 51, 52 and the anchor tether 53 are a silicone elastomer.

During surgery, the electrodes 51, 52 and the anchor tether 53 are coiled around the vagus nerve 61 proximal to the patient's head, each with the assistance of a pair of sutures 54, 55, 56, made of polyester or other suitable material, which help the surgeon to spread apart the respective helices. The lead bodies 57, 58 of the electrodes 51, 52 are oriented distal to the patient's head and aligned parallel to each other and to the vagus nerve 61. A strain relief bend 60 can be formed on the distal end with the insulated electrical lead body 13 aligned, for example, parallel to the helical electrodes 14 and attached to the adjacent fascia by a plurality of tie-downs 59a-b.

The neurostimulator 12 delivers VNS under control of the processing unit 22. The stored stimulation parameters are programmable. Each stimulation parameter can be independently programmed to define the characteristics of the cycles of therapeutic stimulation and inhibition to ensure optimal stimulation for a patient 10. The programmable stimulation parameters include output current, signal frequency, pulse width, signal ON time, signal OFF time, magnet activation (for VNS specifically triggered by "magnet mode"), and reset parameters. Other programmable parameters are possible.

In some embodiments described herein, the stimulation parameters may be manually adjusted and/or adjusted automatically based on a predetermined schedule set by a clinician. In some other embodiments, computer-implemented methods are used for monitoring physiological signals of the patient and dynamically adjusting stimulation parameters in response to the physiological signals. This monitoring and dynamic adjustment may be performed in clinic utilizing an external control system, or it may be automatically performed by an implanted control system coupled to an implanted physiological sensor, such as, for example, an ECG sensor for monitoring heart rate.

Figure 5A:
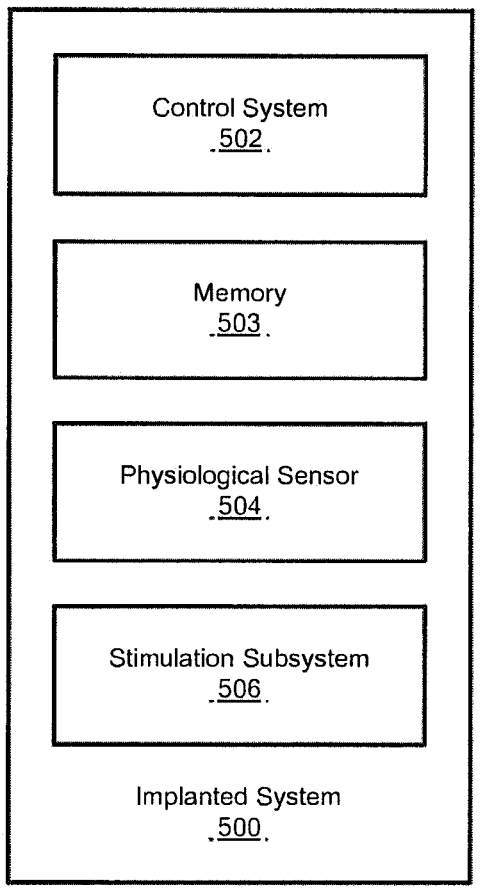
FIGS. 5A-5B are block diagrams of neurostimulation systems in accordance with embodiments of the present invention, according to exemplary embodiments.

For example, FIG. 5A is a simplified block diagram of an implanted neurostimulation system 500 in accordance with embodiments of the present invention. The implanted neurostimulation system 500 comprises a control system 502 comprising a processor programmed to operate the system 500 (e.g., similar to the processing unit 22), a memory 503 (e.g., similar to the memory 29), a physiological sensor 504, and a stimulation subsystem 506. The physiological sensor 504 may be configured to monitor any of a variety of patient physiological signals, and the stimulation subsystem 506 may be configured to deliver a stimulation signal to the patient. In one example, the physiological sensor 504 comprises a front-end sensing configuration (e.g., similar to the front-end sensing configuration 31) configured to obtain an analog cardiac signal from the patient and to provide a comparator output to the control system 502. In some examples, the stimulation subsystem 506 comprises a neurostimulator 12 programmed to deliver ON-OFF cycles of stimulation to the patient's vagus nerve.

The control system 502 is programmed to activate the neurostimulator 12 to deliver varying stimulation intensities to the patient, to monitor the comparator output to determine various aspects of the patient's cardiac signal before, during, and/or after stimulation, and, in some instances, to adjust the stimulation intensities based on the determined aspects of the patient's cardiac signal of the patient. As shown in FIG. 5A, the delivery of the stimulation signal, the monitoring of the comparator output, and the adjusting of the stimulation intensities may be implemented using the control system 502 in communication with both the stimulation subsystem 506 and the physiological sensor 504, by incorporating all of these components into a single implantable system 500.

Figure 5B:
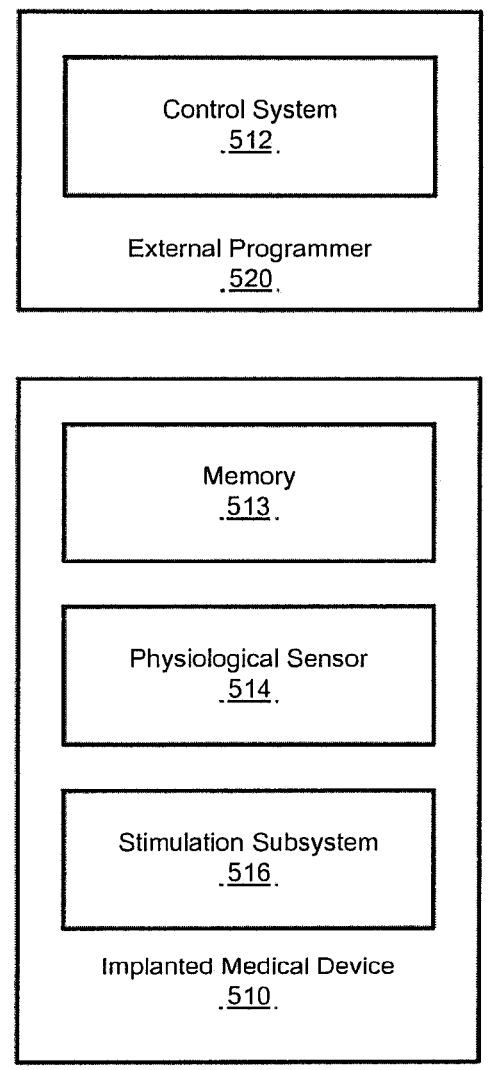

In accordance with other embodiments, a control system 512 may be implemented in a separate implanted device or in an external programmer 520, as shown in FIG. 5B. In some instances, the external programmer 520 in FIG. 5B may allow for a clinician or, in some instances, the patient to adjust the stimulation parameters. In some instances, the external programmer 520 may further allow for automatic adjustment of the stimulation parameters based on a monitored comparator output received from a physiological sensor 514, which may similarly comprise a front-end sensing configuration (e.g., similar to the front-end sensing configuration 31). The external programmer 520 is in wireless communication with an implanted medical device 510, which similarly includes a stimulation subsystem 516. In the illustrated embodiment, the physiological sensor 514 is incorporated into the implanted medical device 510, but in other embodiments, the sensor 514 may be incorporated into a separate implanted device, may be provided externally and in communication with the external programmer 520, or may be provided as part of the external programmer 520. Further, in these instances, the implanted medical device 510 may additionally include an internal control system (e.g., similar to the control system 502) configured to communicate with the control system 512 of the external programmer 520. In these cases, the internal control system may be configured to control real-time aspects associated with sensing (e.g., monitoring the comparator output) and/or stimulation, and may be configured to communicate information associated with the sensing and/or the stimulation to the control system 512 of the external programmer 520.

Automatic Gain Control Algorithm

As described above, the embodiments described herein comprise implantable medical systems and devices (e.g., the implantable vagus stimulation system 11, the implanted neurostimulation system 500, the implanted medical device 510) configured to determine various characteristics of a patient's cardiac signal based on a monitored comparator output received via a front-end sensing configuration (e.g., via the front-end sensing configuration 31 and/or front-end sensing configurations of the physiological sensors 504, 514). In some instances, the implanted systems and/or implanted medical devices described herein may utilize an automatic gain control (AGC) algorithm to automatically adjust a gain applied to the analog cardiac signal obtained from the patient.

Traditionally, implanted systems and medical devices configured to monitor heart rate utilize a static gain setting when processing the cardiac signal obtained from the patient. In these instances, the user typically has to manually set the sensing amplifier gain prior to treatment. Additionally, if the sensing amplifier gain selected prior to treatment fails to accurately sense the patient's heart rate (e.g., missed heart beat detections or false positive heart beat detections), the user may further have to manually change the sensing amplifier gain during treatment. Further, in some instances, the amplitude of the patient's cardiac signal may change during treatment due to various naturally-occurring physiological processes. In these instances, regardless of the sensing amplifier gain selected prior to treatment, if the patient's cardiac signal amplitude increases or decreases during treatment, the sensing amplifier gain may similarly need to be manually increased or decreased to accurately sense the patient's heart rate.

In any case, in addition to the traditionally-required manual gain adjustment, any temporary failure to accurately sense the patient's heart rate can result in less effective stimulation therapy. For example, in some instances, therapeutic stimulation may be applied and adjusted based on the monitored cardiac signal obtained from the patient. In these instances, accurate sensing of the patient's heart rate may be crucial in providing effective stimulation treatment to the patient.

Accordingly, to ensure accurate detection of the patient's heartbeat, the AGC algorithm is configured to automatically adjust the sensing amplifier gain used to process the patient's cardiac signal to compensate for poor heart rate detection and/or changes in the patient's heart beat amplitude. Thus, the AGC algorithm eliminates the burden on the user and/or physician of having to initially set and/or adjust the sensing amplifier gain and allows for continuous, accurate, uninterrupted heart beat detection during stimulation treatment.

Further, the AGC algorithm is configured to adjust the sensing amplifier gain without converting the analog cardiac signal to a digital signal. Specifically, the AGC algorithm is configured to utilize the output of a comparator to adjust the sensing amplifier gain based on the analog cardiac signal. By processing the analog signal directly (i.e., without conducting an analog-to-digital conversion of the cardiac signal), the power consumption requirements associated with the AGC algorithm are reduced as compared to potential AGC algorithms requiring digitized ECG signal data (and thus requiring an analog-to-digital conversion of the cardiac signal). That is, the requirement of digitized ECG signal data by an AGC algorithm may require continuous processing of the cardiac signal (i.e., a continuous analog-to-digital conversion of the cardiac signal) by the associated medical device. On the other hand, the AGC algorithm described herein need only monitor the output of the comparator to adjust the sensing amplifier gain and thereby ensure accurate heartbeat detection. Accordingly, the ACG algorithm described herein eliminates the need for continuous processing of the cardiac signal by the associated systems and medical devices, and thus reduces the computational requirements and power consumption of the associated systems and medical devices.

Figure 6:
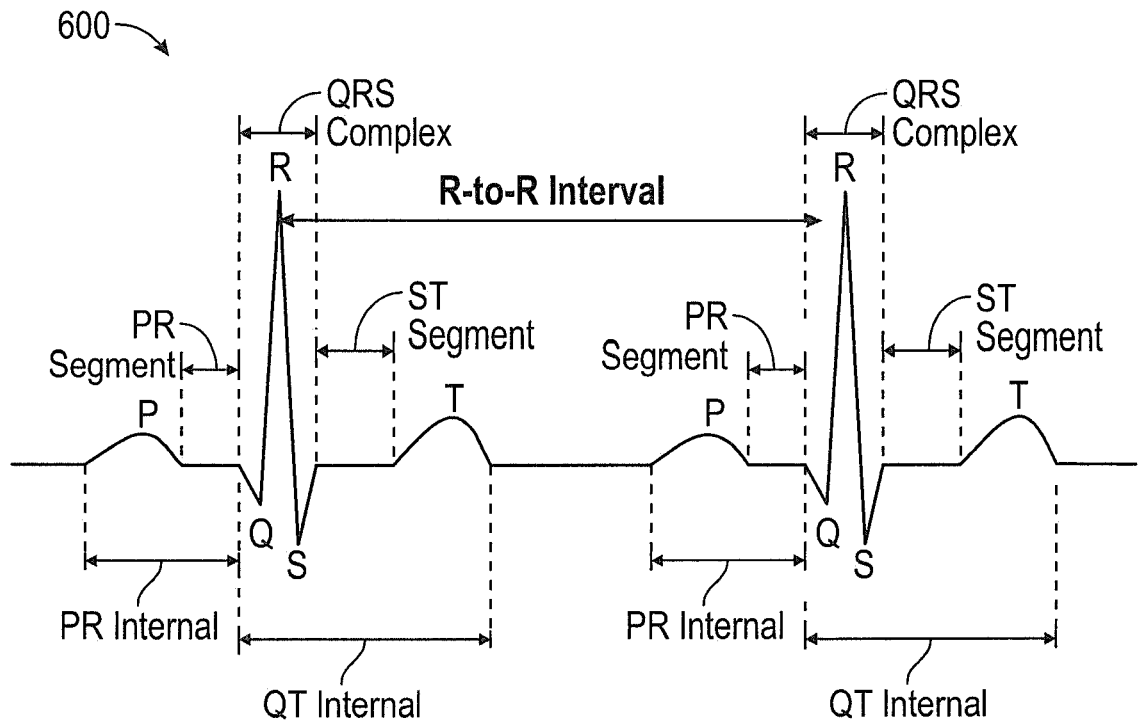
FIG. 6 is an illustrative graphic of a cardiac signal, according to an exemplary embodiment.

Referring now to FIG. 6, a plot 600 of a traditional ECG signal is shown illustrating a pair of consecutive heart beats. As illustrated, each heart beat includes a P-wave, a QRS complex (e.g., including a Q-wave, followed by an R-wave, followed by an S-wave), and a T-wave. As can be seen in FIG. 6, the R-wave (which typically lasts between approximately 60 ms to 92 ms or, in some instances, between approximately 59 ms to 109 ms) is the most prominent component in ECG signal. Accordingly, the R-wave in each cardiac cycle may be detected by setting an appropriate amplitude threshold to sense a patient's individual heartbeats. Once each R-wave is detected, the R-to-R interval can be calculated, as shown in FIG. 6, to determine the patient's heart rate.

However, typical R-wave signal amplitudes are in the order of millivolts and vary both from person to person and over time due to a variety of physiological and pathological conditions. In some instances, a patient's analog cardiac signal has to be amplified (e.g., the sensing amplifier gain) by a factor of approximately 1000 to allow for various patient cardiac characteristics to be accurately determined. In other instances, the ECG signal has to be amplified by larger or smaller factors depending on a given patient's cardiac characteristics.

Accordingly, one challenge in accurately determining various patient cardiac characteristics (e.g., the patient's heartbeats, and thus the patient's heart rate) using the analog cardiac signal, is that, when the R-wave amplitude decreases to a certain degree, the originally-set sensing amplifier gain eventually becomes too low, thus resulting in under-sensing (i.e., missed heart beat detections). On the other hand, when the R-wave amplitude increases to a certain degree, the originally-set sensing amplifier gain eventually becomes too high, thus resulting in over-sensing (i.e., false positive heart beat detections). Therefore, to reliably determine the patient cardiac characteristics using the analog cardiac signal, the sensing amplifier gain has to be adjusted in response to changes in the analog cardiac signal amplitude. As discussed above, the AGC algorithm described herein is configured to allow for the continuous, automatic adjustment of the sensing amplifier gain over time (i.e., throughout the lifetime of the medical device) without additional input from a physician. That is, the AGC algorithm ensures that a proper gain setting is continuously applied to the analog cardiac signal, despite changes in the amplitude of the analog cardiac signal, by responsively adapting the gain level in response to the changes in the amplitude.

Figure 7:
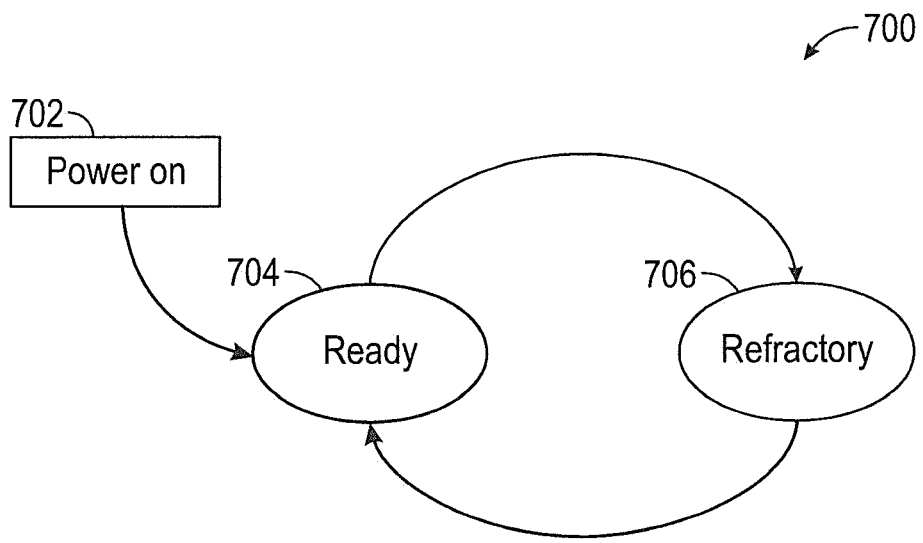
FIG. 7 is a state diagram of a medical device utilizing an automatic gain control algorithm, according to an exemplary embodiment.

Referring now to FIG. 7, a state diagram 700 of a medical device utilizing the AGC algorithm is shown, according to one embodiment of the present disclosure. Specifically, in some instances, once the medical device (e.g., the implantable vagus stimulation system 11, the implanted neurostimulation system 500, the implanted medical device 510) is powered on, at block 702, the medical device automatically enters a ready state 704. In some other instances, with the medical device powered on, the AGC algorithm may be selectively enabled or disabled by a user (e.g., a physician, a patient, a care provider). In these instances, the medical device may enter the ready state 704 in response to the AGC algorithm being enabled. With the medical device in the ready state 704, the medical device is then configured to switch between the ready state 704 and a refractory state 706 based on comparator trips caused by the patient's cardiac signal.

Figure 8:
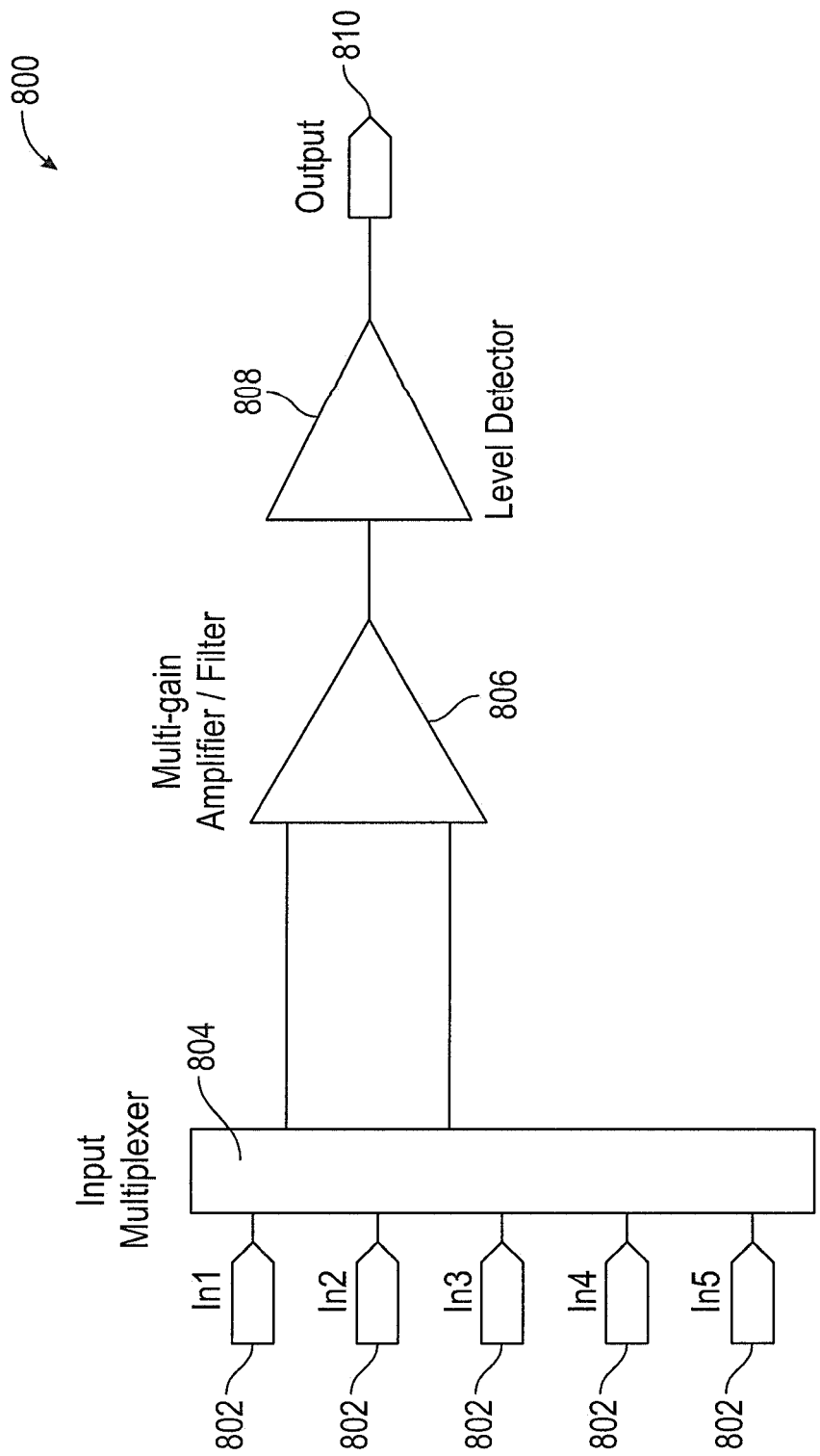
FIG. 8 is a simplified diagram showing a front-end sensing configuration for processing a cardiac signal, according to an exemplary embodiment.

For example, FIG. 8 depicts an exemplary front-end sensing configuration schematic 800. As illustrated, the front-end sensing configuration includes a plurality of sensing input channels 802 configured to receive various voltage potentials from various electrodes within the patient. The voltage potentials are then fed into an input multiplexer 804, which outputs a reference voltage and a sensed voltage to be used to determine a voltage difference between the reference and sensed voltages. This voltage difference is indicative of the patient's cardiac signal. The front-end sensing configuration then further includes at least one multi-gain amplifier/filter 806 configured to filter and apply a gain to the patient's cardiac signal. The amplified and filtered signal is then applied to at least one level detector or comparator 808 to determine whether the amplified and filtered signal exceeds or, in the case of a negative voltage threshold, drops below a predetermined signal threshold of the comparator 808. That is, the comparator 808 is configured to continuously compare the amplitude of the amplified and filtered signal to the predetermined signal threshold and output either an indication that the amplitude of the signal has not exceeded or, in the case of a negative voltage threshold, has not dropped below the predetermined threshold (e.g., a value of 0) or an indication that the amplitude of the signal has exceeded or, in the case of a negative voltage threshold, has dropped below the predetermined threshold (e.g., a value of one). The comparator output is then provided to the processing unit (e.g., the processing unit 22) of the medical device via an output channel 810.

The term "comparator trip" is utilized herein to signify an instance where the comparator 808 has output an indication that the amplitude of the signal has exceeded or, in the case of a negative voltage threshold, has dropped below the corresponding predetermined threshold (e.g., the comparator has output a value of one). In some instances, the term "comparator trip" may also signify that at least one comparator 808 of a plurality of comparators has output a value of one. For example, in some instances, if there are a plurality of comparators 808, the output of each of the comparators 808 may be fed into an OR operator such that, if any of the comparators 808 outputs a comparator trip (e.g., a value of one), the OR operator outputs a comparator trip indication (e.g., a value of one) to the processing unit via the output channel 810.

For example, in some instances, two comparators 808 may be utilized in the front-end sensing configuration. In some of these instances, a first comparator may have a predetermined threshold of 100 mV and a second comparator may have a predetermined threshold of −85 mV. However, it will be appreciated that, in other instances, more or less than two comparators 808 may be utilized and each comparator may have a different predetermined threshold, as desired for a given application.

In some instances, the comparator 808 is further configured such that the amplified and filtered signal needs to exceed or drop below the predetermined signal threshold for a period of time before a comparator trip is generated. In some instances, this period of time may be approximately 2 ms. In other instances, this period of time may be longer or shorter depending on the type of comparator utilized. Additionally, after a comparator trip is generated by the comparator 808, the comparator 808 may be temporarily "tripped," deactivated, or otherwise held inactive until it is reset. For example, in some instances, the medical device (e.g., the processing unit 22, the control system 502, the control system 512) may be configured to reset the comparator 808 approximately 2 ms after a comparator trip.

Accordingly, in some instances, a minimum time period between consecutive comparator trips may be approximately 4 ms (e.g., the sum of the "tripped," deactivated, or otherwise inactive period and the period of time that the amplified and filtered signal must exceed or drop below the predetermined signal threshold to generate a subsequent comparator trip). In some other instances, the medical device may be configured such that minimum time period between consecutive comparator trips is higher or lower than 4 ms, as desired for a given application.

It should be appreciated that the particular configuration, layout, filter selection, and gain selection discussed above are provided as examples, and that the AGC algorithm described herein may be applied using various other configurations, layouts, filter selections, and gain selections without departing from the scope of the present disclosure.

Figure 9:
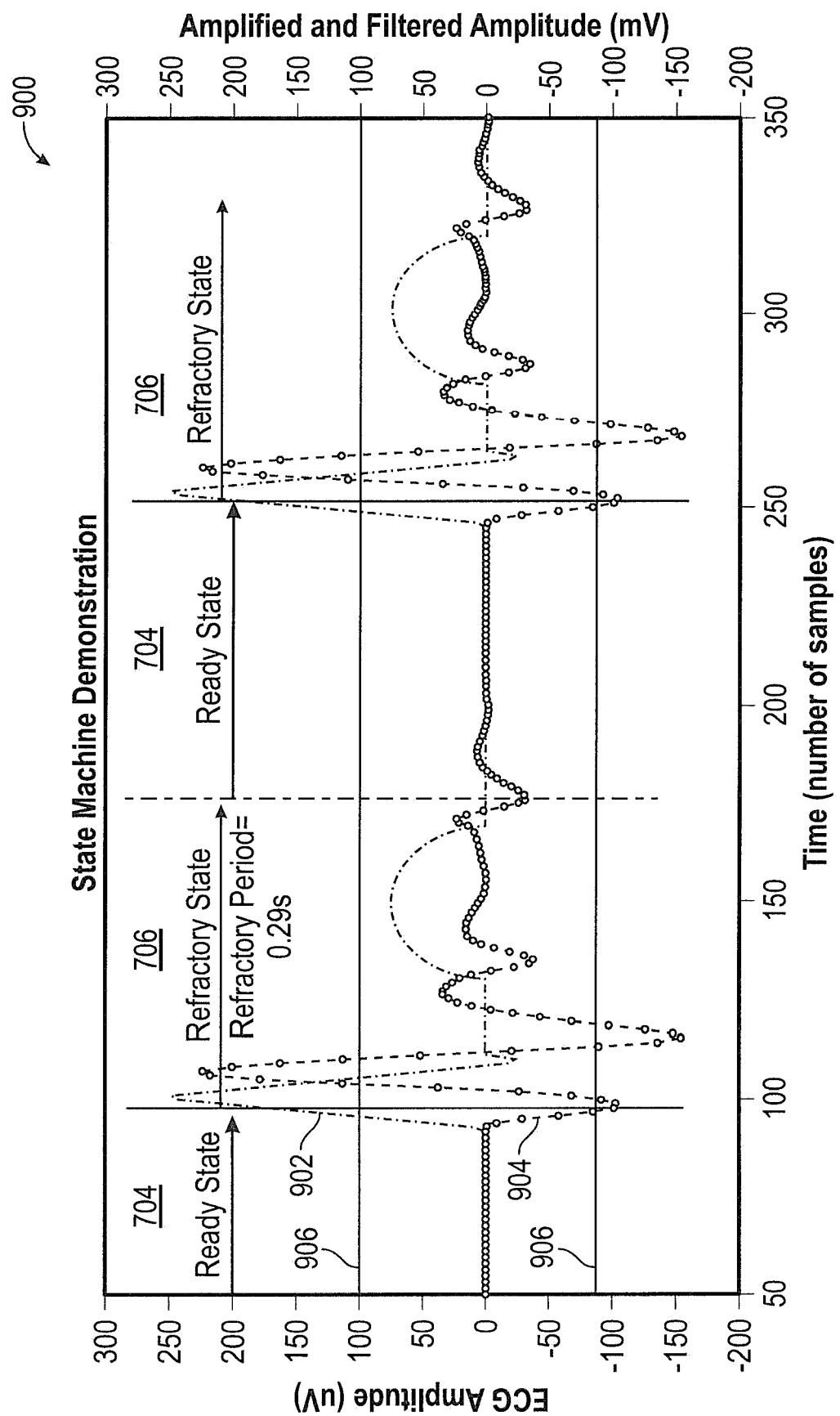
FIG. 9 is a cardiac signal graph depicting a generated input cardiac signal and a filtered output signal, according to an exemplary embodiment.

Referring now to FIG. 9, a cardiac signal graph 900 is illustrated depicting a generated input cardiac signal 902 (depicted with respect to the left-hand scale in μV) and a filtered and amplified signal 904 (depicted with respect to the right-hand scale in mV) detected by the front-end sensing configuration shown in FIG. 8 (e.g., before being applied to the comparator 808. The cardiac signal graph 900 further includes a pair of comparator trip thresholds 906 (e.g., a positive threshold and a negative threshold) configured to generate a positive comparator trip when exceeded. For example, the comparator trip thresholds 906 illustrated in FIG. 9 are set at 100 mV and −85 mV. Accordingly, if the filtered and amplified signal 904 rises above 100 mV or drops below −85 mV, a comparator trip is triggered. However, in other instances, the comparator trip thresholds 906 can be set higher or lower, as desired for a given application.

As illustrated, the medical device may initially start in the ready state 704 and, upon detection of the patient's heartbeat, may switch into the refractory state 706. The medical device may then remain in the refractory state 706 for a refractory period. The refractory period may be a predetermined time period set or programmed into the AGC algorithm. For example, in some instances, the refractory period may be set to approximately 290 ms. In these instances, the AGC algorithm may be configured to handle a maximum heart rate of approximately 206.9 bpm. However, in some other instances, the refractory period may be higher or lower to handle higher or lower maximum heart rates, as desired for a given application. For example, in some instances, the refractory period may be between 100 ms and 500 ms.

Figure 10:
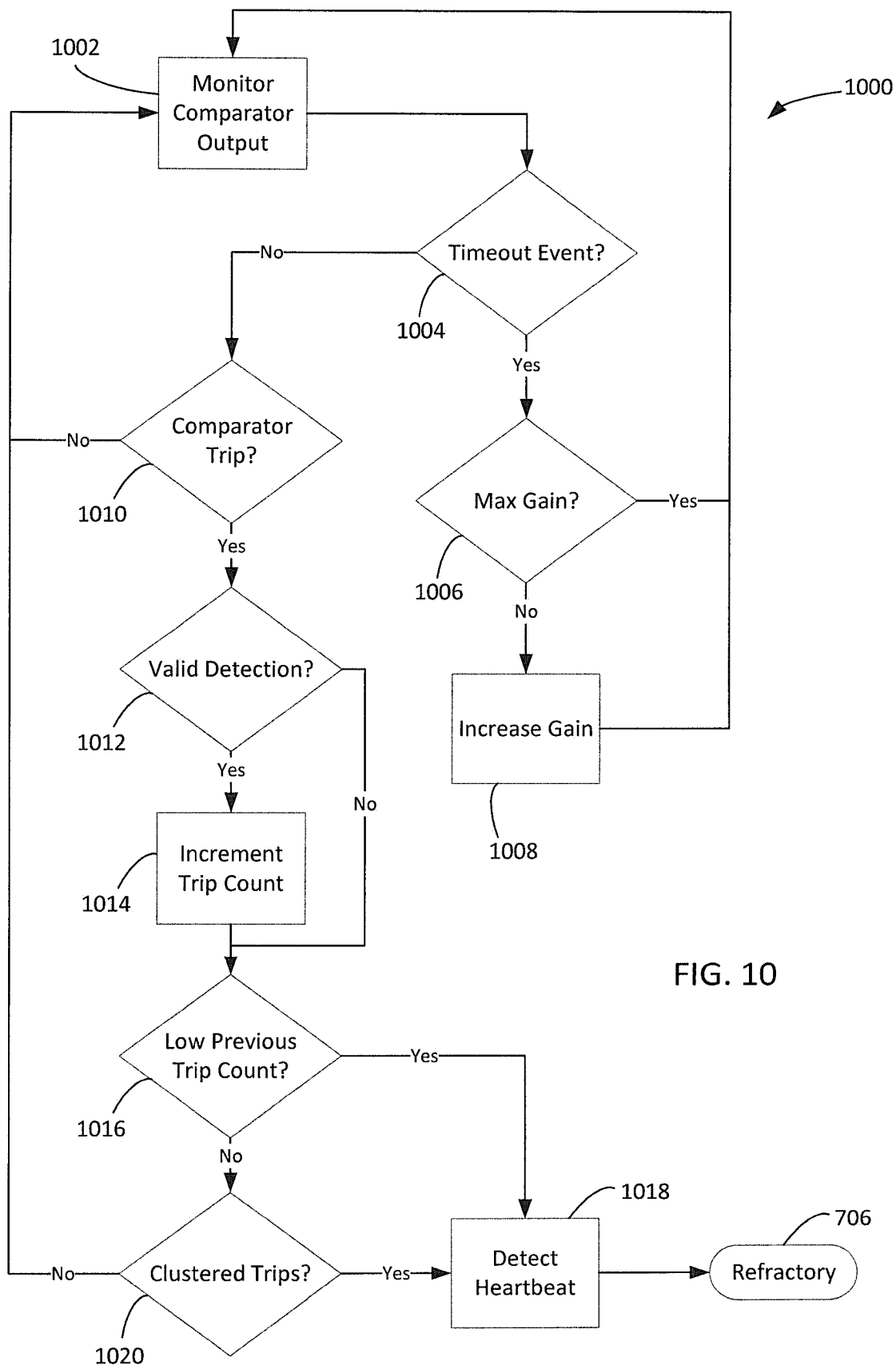
FIG. 10 is a flowchart for a method of operation of a medical device within a ready state, according to an exemplary embodiment.

Referring now to FIG. 10, a flowchart of a method 1000 showing various processing steps performed by the medical device (e.g., the processing unit 22, the control system 502, the control system 512) within the ready state 704 is depicted, according to one embodiment of the present disclosure. It should be appreciated that the following method is provided as an example, and that various steps may be omitted and/or performed in a different order, as desired for a given application, without departing from the scope of the present disclosure.

For example, within the ready state 704, the medical device may continuously monitor (e.g., via the processing unit 22, the control system 502, and/or the control system 512) a comparator output from a front-end sensing configuration (e.g., from the front-end sensing configuration 31, the physiological sensor 504, or the physiological sensor 514), at step 1002. While monitoring the comparator output, the medical device may determine whether a timeout event has occurred, at step 1004. For example, the medical device may be programmed with a predetermined timeout period within which the medical device is expected to detect a heartbeat of the patient. In some instances, the timeout period may set to three seconds. In some other instances, the timeout period may be set to higher or lower amounts of time, as desired for a given application. In any case, if the medical device determines, at step 1004, that no heartbeat has been detected for a time period exceeding the timeout period, this triggers a timeout event.

Upon detecting a timeout event, at step 1004, the medical device may then determine whether a maximum gain setting or level is being used, at step 1006. If the medical device is not at the maximum gain setting or level, the medical device may then increase the gain by one setting or level (e.g., minimum to medium, medium to maximum), at step 1008. After increasing the gain or determining that the medical device is at the maximum gain setting or level, the medical device may then restart the timeout period and return to the beginning of the method 1000 by continuing to monitor the comparator output, at step 1002.

If the medical device determines that there has not been a timeout event, at step 1002, the medical device, while continuously monitoring the comparator output, may further determine whether there has been a comparator trip, at step 1010, as discussed above, with reference to FIG. 9. If there has not been a comparator trip, the medical device may similarly return to the beginning of the method 1000 by continuing to monitor the comparator output, at step 1002. Accordingly, it should be appreciated that, if no timeout event occurs and no comparator trip is detected, the medical device is configured to continuously monitor the comparator output, at step 1002.

Alternatively, if the medical device determines that there has been a comparator trip, at step 1010, the medical device may then determine whether the comparator trip constitutes a valid detection, at step 1012. For example, in some instances, a comparator trip may only be considered a valid detection if the comparator trip happened within a detection time period threshold of a previous comparator trip. That is, the medical device may determine a time period between the comparator trip and a previous comparator trip and then determine whether the comparator trip is a valid detection based on the time period being below the detection time period threshold.

For example, in some instances, the detection time period threshold may be set to approximately 20 ms. In some other instances, the detection time period threshold may be set higher or lower, as desired for a given application. For example, in some instances, the detection time period threshold may be set between 2 ms and 100 ms. In any case, determining whether the comparator trip constitutes a valid detection (e.g., that the comparator trip happened within a detection time period threshold of the previous comparator trip) allows for the medical device to effectively rule out or filter out random noise within the cardiac signal. Further, it will be appreciated that, because a comparator trip is determined to be a valid detection based on a previous comparator trip, the first comparator trip detected by the medical device will not be counted as a valid comparator trip.

If the medical device determines that the comparator trip constitutes a valid detection, at step 1012, the medical device may then increment a comparator trip count, at step 1014. The comparator trip count is a running total of valid comparator trips since a previous refractory period ended (or since the medical device entered the ready state 704).

After incrementing the comparator trip count, at step 1014, or determining that the comparator trip did not constitute a valid detection, at step 1012, the medical device may first determine whether a previous heartbeat comparator trip count associated with a preceding detected heartbeat was below a trip count threshold, at step 1016. If the previous heartbeat comparator trip count was below the trip count threshold, the medical device may then be configured to detect a heartbeat, at step 1018. That is, in some instances, when the input signal (e.g., the analog cardiac signal) is low and the gain is at a maximum level, there may be conditions where the R-wave amplitude will not create many comparator trips. This trip count threshold determination step (i.e., step 1016) is configured to allow for the ability to still detect a heartbeat in these conditions despite the low number of comparator trips. For example, in some instances, the trip count threshold may be set to eight comparator trips. In some other instances, the trip count threshold may be set higher or lower, as desired for a given application.

Alternatively, if the previous heartbeat comparator trip count was not below the trip count threshold, at step 1016, the medical device may then determine whether the valid comparator trip was tightly clustered with at least two adjacent previous valid comparator trips, at step 1020. Said differently, the medical device may determine whether a predetermined amount of clustered valid comparator trips (e.g., three or more), including the current valid comparator trip, have occurred.

For example, to determine whether the valid comparator trip was clustered with the at least two adjacent previous valid comparator trips, the medical device may add up the time periods between each consecutive comparator trip and determine whether the sum of the added time periods is below a cluster time window threshold. For example, in some instances, the cluster time window threshold may be set to approximately 20 ms. In some other instances, the cluster time window threshold may be set higher or lower than 20 ms, as desired for a given application. Further, in some instances, the medical device may determine whether the valid comparator trip was tightly clustered with more than two (e.g., between 3 and 10) adjacent previous valid comparator trips. In any case, determining whether the valid comparator trip was tightly clustered with multiple adjacent previous valid comparator trips provides another layer of filtering for the medical device to effectively filter out noise within the cardiac signal.

If the valid comparator trip was not clustered with the previous two comparator trips, the medical device may then return to the beginning of the method 1000, at step 1002. Alternatively, if the validly-detected comparator trip was clustered with the previous two comparator trips, the medical device may detect a heartbeat of the patient, at step 1018. Once the medical device detects a patient heartbeat, at step 1018, the medical device may then enter the refractory state 706.

Figure 11:
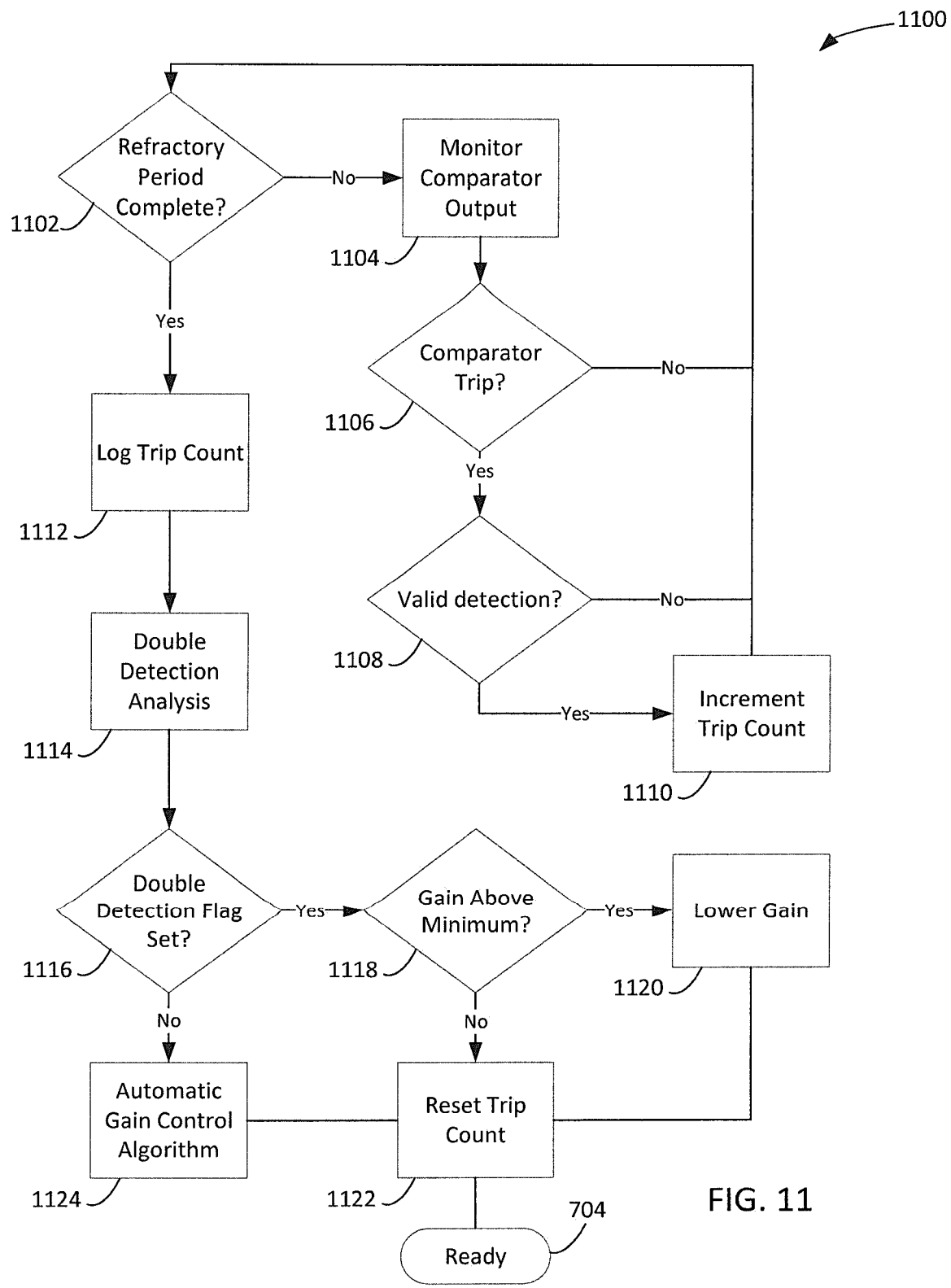
FIG. 11 is a flowchart for a method of operation of a medical device within a refractory state, according to an exemplary embodiment.

Referring now to FIG. 11, a flowchart of a method 1100 showing various processing steps performed by the medical device within the refractory state 706 is depicted, according to one embodiment of the present disclosure. It should be appreciated that the following method is provided as an example, and that various steps may be omitted and/or performed in a different order, as desired for a given application, without departing from the scope of the present disclosure.

For example, once entering the refractory state 706, the medical device may first determine whether the refractory period is complete, at step 1102. As discussed above, the refractory period may be a preset time period in which the medical device is configured to remain in the refractory state 706.

If the medical device determines that the refractory period is not complete, the medical device may continue to monitor the comparator output, at step 1104. The medical device then determines whether there has been a comparator trip, at step 1106, as discussed above, with reference to FIG. 9. If there has not been a comparator trip, the medical device then returns to the beginning of the method 1100, at step 1102. Alternatively, if there has been a comparator trip, the medical device then determines whether the comparator trip constitutes a valid detection, at step 1108, similar to the process discussed above, with respect to step 1012 of the method 1000.

If the comparator trip is not a valid comparator trip (e.g., the comparator trip does not constitute a valid detection, the medical device returns to the beginning of the method 1100, at step 1102. Alternatively, if the comparator trip is a valid comparator trip, the medical device then increments the comparator trip count, at step 1110. It should be appreciated that the comparator trip count in the refractory state 706 is continued or otherwise maintained when the medical device switches from the ready state 704 to the refractory state 706, such that the comparator trip count in the refractory state includes all of the valid comparator trips from both the ready state 704 and the refractory state 706. Once the comparator trip count has been incremented, the medical device then returns to the beginning of the method 1100, at step 1102.

If the medical device determines that the refractory period is complete, at step 1102, the medical device may then log or otherwise store the comparator trip count (e.g., within the recordable memory 29, the memory 503, the memory 513), at step 1112. The medical device then performs a double detection analysis, at step 1114.

Figure 12:
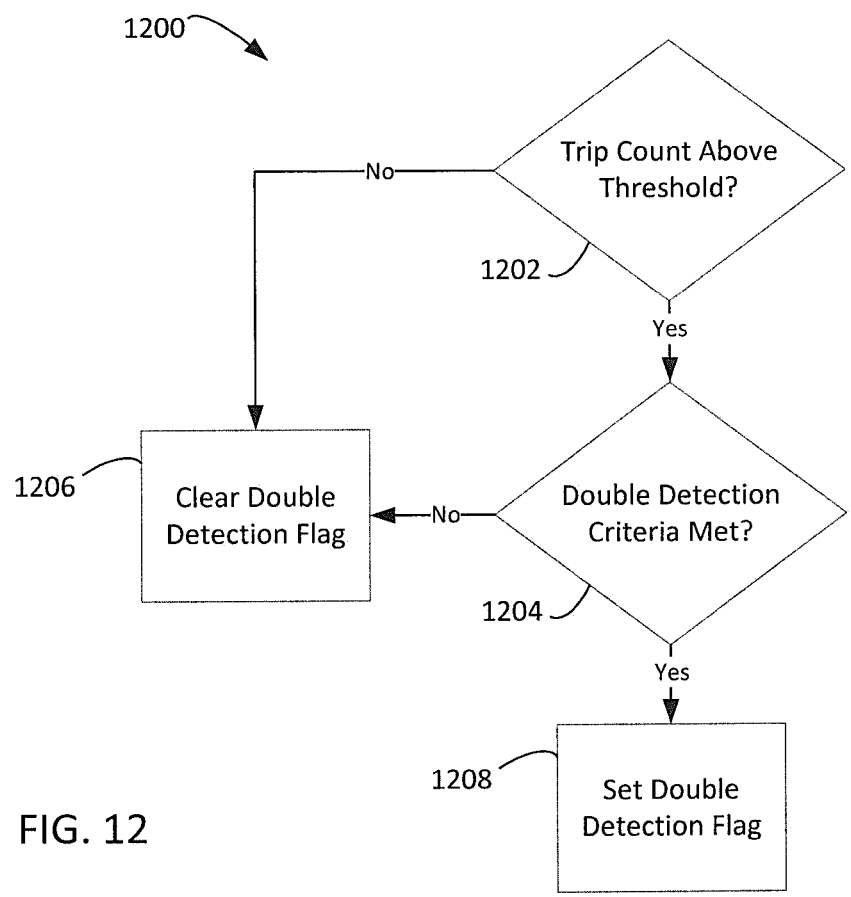
FIG. 12 is a flowchart for a method of operation of a medical device performing a double detection analysis, according to an exemplary embodiment.

For example, FIG. 12 shows a flowchart of a method 1200 showing various processing steps performed by the medical device during the double detection analysis. It should be appreciated that the following method is provided as an example, and that various steps may be omitted and/or performed in a different order, as desired for a given application, without departing from the scope of the present disclosure.

At a high level, the double detection analysis is configured to determine whether the medical device is inadvertently detecting the T-wave of the patient's heartbeat as a separate heartbeat. That is, if the gain level applied to the cardiac signal is set too high, both the R-wave and the T-wave of the patient's heartbeat (shown in FIG. 6) may each trigger a heartbeat detection, causing a "double detection." In these instances, the medical device is configured to lower the gain level, as will be described below.

In some instances, medical device first determines whether the comparator trip count is above a double detection threshold, at step 1202. For example, the double detection threshold may be a preset value configured to trigger the double detection analysis. In some instances, the double detection threshold may be set at 20 valid comparator trips. In some other instances, the double detection threshold may be set higher or lower than 20 valid comparator trips, as desired for a given application. For example, in some instances, the double detection threshold may be set to a value between 15 and 40 valid comparator trips.

If the comparator trip count is not above the double detection threshold, the medical device may proceed to clear a double detection flag (e.g., set a value of the double detection flag to 0), at step 1206, ending the double detection analysis. Alternatively, if the comparator trip count is above the double detection threshold, the medical device may proceed to determine if criteria for a double detection is met, at step 1204.

For example, an R-wave generally has a significantly higher amplitude than the corresponding T-wave of the patient's heartbeat. Accordingly, the R-wave will generally create a significantly greater amount of corresponding valid comparator trips as compared to the corresponding T-wave. In some instances, the R-wave may create approximately twice as many valid comparator trips than the corresponding T-wave. Accordingly, the medical device may determine whether a double detection has occurred by comparing the number of valid comparator trips from the current detected heartbeat to corresponding numbers of valid comparator trips from a number of detected heartbeats within a double detection window. The double detection window includes the current detected heartbeat and a predetermined number of previous detected heartbeats preceding the current detected heartbeat. That is, if several of the heartbeats beats in the double detection window had relatively high numbers of comparator trips (e.g., above 50% of the number of valid comparator trips as the current detected heartbeat) and several of the beats in the double detection window had relatively low numbers of comparator trips (e.g., below 50% of the number of valid comparator trips as the current detected heartbeat), the medical device may determine that a double detection is occurring at the present gain level.

In some instances, the medical device may determine whether, within the double detection window, approximately half of the detected heartbeats had a significantly lower number (e.g., below 50%) of valid comparator trips compared to the current detected heartbeat. If this condition is met, this may indicate to the medical device that a double detection is occurring at the present gain level.

For example, in some instances, the number of valid comparator trips from the current detected heartbeat may be compared with the number of valid comparator trips from the previous seven heartbeats, providing a double detection window of eight heartbeats. In other instances, the number of valid comparator trips from the current detected heartbeat may be compared to the number of valid comparator trips from a different amount of previous heartbeats (e.g., between 1 and 15 previous heartbeats) to create a double detection window of varying size, as desired for a given application.

In some instances, the medical device may determine whether approximately half of the heartbeats within the double detection window (e.g., three or four heartbeats) had a number of valid comparator trips that were less than a first threshold percentage (e.g., 50%) of the number of valid comparator trips detected during the current detected heartbeat, while approximately half of the heartbeats within the double detection window (e.g., three or four heartbeats) had a number of valid comparator trips that were more than a second threshold percentage (e.g., 50%) of the number of valid comparator trips detected during the current detected heartbeat. In some instances, the first and second threshold percentages may be the same value (e.g., 50%). In other instances, the first and second threshold percentages may be individually selected, as desired for a given application. If these criteria are met, the medical device determines that a double detection is occurring. If these criteria are not met, the medical device determines that a double detection is not occurring.

Accordingly, if the medical device determines that a double detection is not occurring, at step 1204, the medical device proceeds to clear the double detection flag, at step 1206, ending the double detection analysis. Alternatively, if the medical device determines that a double detection is occurring, at step 1204, the medical device proceeds to set the double detection flag (e.g., set the value of the double detection flag to 1), at step 1208, similarly ending the double detection analysis.

Referring again to FIG. 11, once the double detection analysis has been performed, at step 1114, the medical device then determines whether the double detection flag has been set (e.g., whether the double detection flag has a value of 1), at step 1116. If the double detection flag has been set, the medical device then determines whether the gain level is above a minimum gain level, at step 1118. If the gain level is above the minimum gain level, the medical device then lowers the gain level by one gain level (e.g., from a maximum gain level to a medium level or from a medium gain level to a minimum gain level), at step 1120, resets the valid comparator trip count (e.g., sets the valid comparator trip count to 0), at step 1122, and returns to the ready state 704. Alternatively, if the gain level is at the minimum gain level, the medical device proceeds to reset the valid comparator trip count, at step 1122, and return to the ready state 704.

Figure 13:
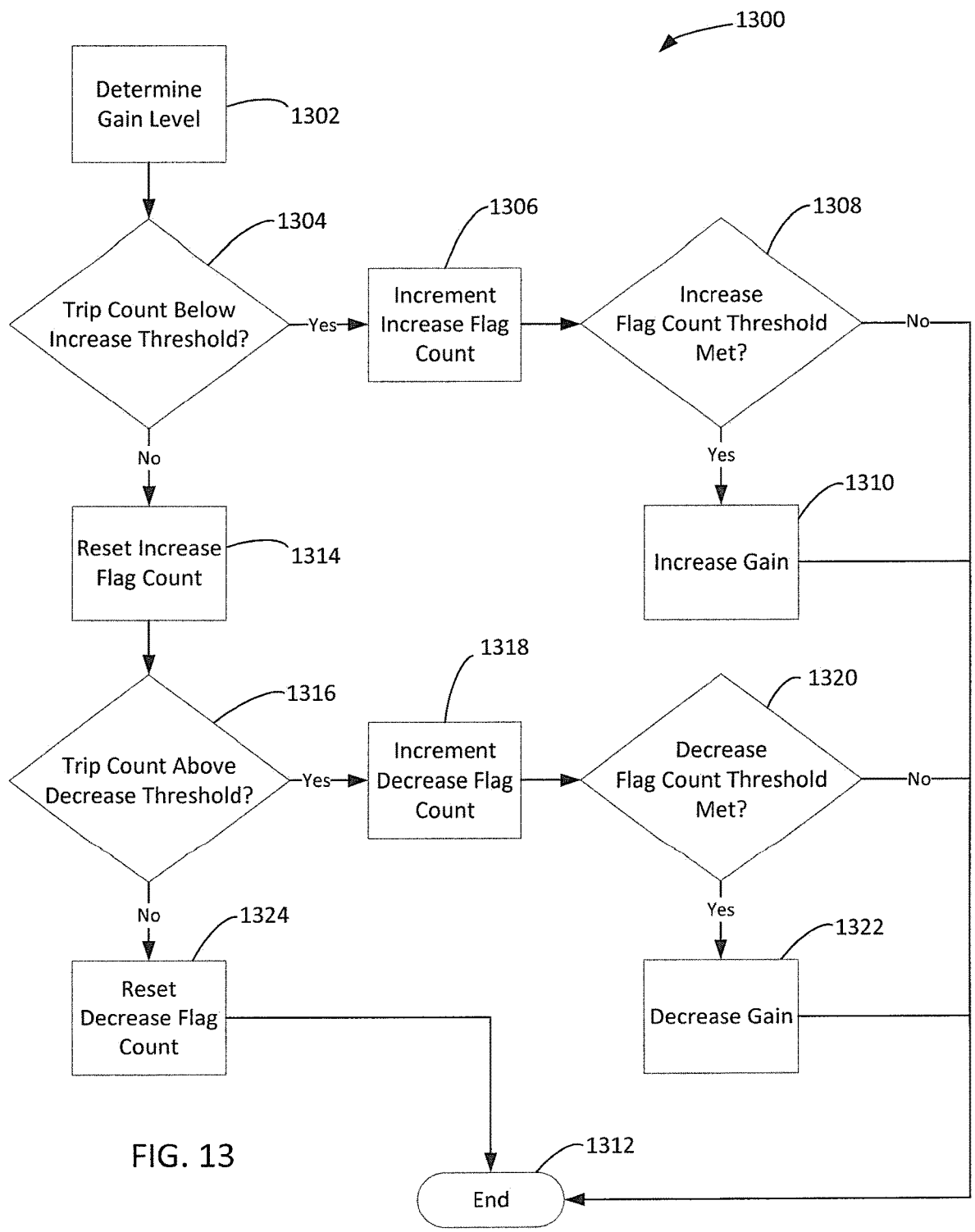
FIG. 13 is a flowchart for a method of operation of a medical device performing an automatic gain control algorithm, according to an exemplary embodiment.

If the medical device determines that the double detection flag has not been set, at step 1116, the medical device proceeds to perform an automatic gain control (AGC) analysis, at step 1124. For example, FIG. 13 depicts a method 1300 showing various processing steps performed by the medical device during the AGC analysis. It should be appreciated that the following method is provided as an example, and that various steps may be omitted and/or performed in a different order, as desired for a given application, without departing from the scope of the present disclosure. Further, it should be appreciated that the AGC analysis is only a portion of the entire AGC algorithm described herein, with reference to the state diagram 700, the method 1000, and the method 1100.

For example, the AGC analysis may begin with the medical device determining a gain level being applied to the cardiac signal, at step 1302. In some instances, the medical device may be configured to automatically switch between a number of different gain levels or settings. For example, in some instances, the medical device may be configured to automatically switch between a minimum gain level, a medium gain level, and a maximum gain level. In some other instances, the medical device may be configured to automatically switch between more or less gain levels (e.g., between 2 and 10 different gain levels), as desired for a given application.

Once the gain level has been determined, at step 1302, the medical device may then determine whether the valid comparator trip count is below a corresponding gain increase threshold, at step 1304. For example, each gain level used by the medical device (with the exception of the maximum gain level) has a corresponding gain increase threshold, which, if fallen below for a predetermined number of heartbeats, indicates that the gain level of the medical device should be increased.

Accordingly, if the valid comparator trip count is below the corresponding gain increase threshold, the medical device may proceed to increment a gain increase flag count, at step 1306. The gain increase flag count is configured to track a number of consecutive heartbeats which have had a valid comparator trip count below the corresponding gain increase threshold.

The medical device may then determine whether the gain increase flag count is equal to or above a corresponding gain increase flag count threshold, at step 1308. The gain increase flag count threshold corresponds to the predetermined number of heartbeats for which, if the valid comparator trip continuously remains below the gain increase threshold, the medical device is triggered to increase the gain level applied to the cardiac signal. That is, for each consecutive heartbeat having a valid comparator trip below the gain increase threshold, the gain increase flag count is increased by one, and the gain increase flag count threshold corresponds to a threshold number for the gain increase flag count.

In some instances, the gain increase flag count threshold may be set to three (e.g., there must be at least three consecutive heartbeats having a valid comparator trip count below the corresponding gain increase threshold). In some other instances, the gain increase flag count threshold may be set higher or lower, as desired for a given application. For example, in some instances, the gain increase flag count threshold may be set between 1 and 20.

Accordingly, if the gain increase flag count is at or above the gain increase flag count threshold, the medical device may then increase the gain level by one level (e.g., from the minimum gain level to the medium gain level or from the medium gain level to the maximum gain level), at step 1310, and end the AGC analysis, at step 1312. Alternatively, if the gain increase flag count is below the gain increase flag count threshold, the medical device may just end the AGC analysis, at step 1312.

As an example of the method steps discussed above, in some instances, where the medical device is configured to automatically switch between a minimum gain level, a medium gain level, and a maximum gain level, the gain increase threshold for the minimum gain level may be six valid comparator trips and the gain increase threshold for the medium gain level may similarly be six valid comparator trips. Accordingly, in these instances, if the gain level is at the minimum gain level or the medium gain level and the valid comparator trip count is below six valid comparator trips, the medical device increments the gain increase flag count. Then, if the gain increase flag count threshold is at or above the increase flag count threshold (e.g., three consecutive heartbeats), the medical device then increases the gain from either the minimum gain level to the medium gain level or from the medium gain level to the maximum gain level.

If, however, the valid comparator trip count is not below the corresponding gain increase threshold, at step 1304, the medical device may proceed to reset the gain increase flag count (e.g., zero-out or set the value of the gain increase flag count to zero). Accordingly, if there is a single heartbeat that has a valid comparator trip count above the corresponding gain increase threshold, the gain increase flag count is reset.

Once the gain increase flag count has been reset, at step 1314, the medical device may then determine whether the valid comparator trip count is above a corresponding gain decrease threshold, at step 1316. For example, each gain level used by the medical device (with the exception of the minimum gain level) has a corresponding gain decrease threshold, which, if exceeded for a predetermined number of heartbeats, indicates that the gain level of the medical device should be decreased.

Accordingly, if the valid comparator trip count is above the corresponding gain decrease threshold, the medical device may proceed to increment a gain decrease flag count, at step 1318. The gain decrease flag count is configured to track a number of consecutive heartbeats which have had a valid comparator trip count above the corresponding gain decrease threshold.

The medical device may then determine whether the gain decrease flag count is equal to or above a corresponding gain decrease flag count threshold, at step 1320. The gain decrease flag count threshold corresponds to the predetermined number of heartbeats for which, if the valid comparator trip continuously exceeds the gain decrease threshold, the medical device is triggered to decrease the gain level applied to the cardiac signal. That is, for each consecutive heartbeat having a valid comparator trip above the gain decrease threshold, the gain decrease flag count is increased by one, and the gain decrease flag count threshold corresponds to a threshold number for the gain decrease flag count.

In some instances, the gain decrease flag count threshold may similarly be set to three (e.g., there must be at least three consecutive heartbeats having a valid comparator trip count above the corresponding gain decrease threshold). In some other instances, the gain decrease flag count threshold may be set higher or lower, as desired for a given application. For example, in some instances, the gain decrease flag count threshold may be set between 1 and 20.

Accordingly, if the gain decrease flag count is at or above the gain decrease flag count threshold, the medical device may then decrease the gain level by one level (e.g., from the maximum gain level to the medium gain level or from the medium gain level to the minimum gain level), at step 1322, and end the AGC analysis, at step 1312. Alternatively, if the gain decrease flag count is below the gain increase flag count threshold, the medical device may just end the AGC analysis, at step 1312.

As an example of the method steps discussed above, in some instances, where the medical device is configured to automatically switch between a minimum gain level, a medium gain level, and a maximum gain level, the gain decrease threshold for the medium gain level may be 20 valid comparator trips and the gain decrease threshold for the maximum gain level may be 22 valid comparator trips. Accordingly, in these instances, if the gain level is at the medium gain level or the maximum gain level and the valid comparator trip count is above 20 valid comparator trips (for the medium gain level) or 22 valid comparator trips (for the maximum gain level), the medical device increments the gain decrease flag count. Then, if the gain decrease flag count threshold is at or above the decrease flag count threshold (e.g., three consecutive heartbeats), the medical device then decreases the gain from either the maximum gain level to the medium gain level or from the medium gain level to the minimum gain level.

If, however, the valid comparator trip count is not above the corresponding gain decrease threshold, at step 1316, the medical device may proceed to reset the gain decrease flag count (e.g., zero-out or set the value of the gain decrease flag count to zero). Accordingly, if there is a single heartbeat that has a valid comparator trip count below the corresponding gain decrease threshold, the gain decrease flag count is reset.

It should be appreciated that the various thresholds discussed above (e.g., the gain increase threshold, the gain decrease threshold, the gain increase flag count threshold, the gain decrease flag count threshold) are provided as examples, and are in no way meant to be limiting. For example, in some embodiments, the various thresholds may have differing and/or different values generally than those described above.

Additionally, it will be appreciated that some of the method steps discussed above may be omitted or otherwise skipped in certain scenarios. For example, if the gain level is set to the maximum gain level, steps 1304 and 1314 may be skipped and the medical device may proceed directly from determining the gain level, at step 1302, to determining whether the valid comparator trip count is above the gain decrease threshold, at step 1316. Similarly, if the gain level is set to the minimum gain level, steps 1316 and 1324 may be skipped and the medical device may proceed directly from resetting the gain increase flag count, at step 1314, to ending the AGC analysis, at step 1312.

Figure 14:
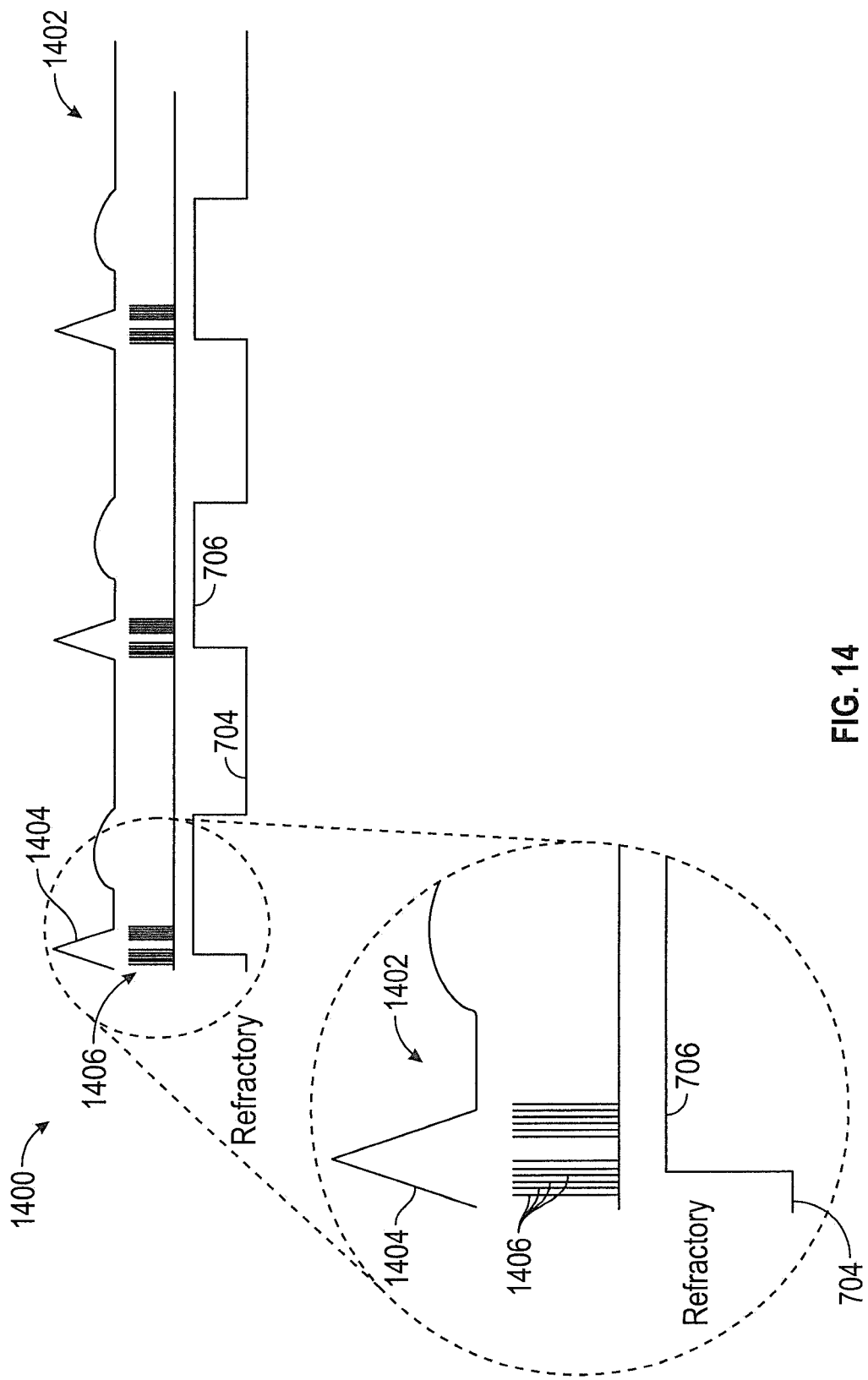
FIG. 14 is an illustrative graphic of a cardiac signal, a corresponding number of comparator trips, and a state indication of a medical device, according to an exemplary embodiment.

Referring now to FIG. 14, a graphical depiction 1400 of the medical device switching between the ready state 704 and the refractory state 706 (e.g., while performing the methods 1000 and 1100 described above), according to one embodiment of the present disclosure. For example, as depicted, the medical device may obtain an analog cardiac signal 1402 of a patient (e.g., via the front-end sensing configuration 31, the physiological sensor 504, and/or the physiological sensor 514). During an R-wave 1404 of the analog cardiac signal 1402, a plurality of comparator trips 1406 are detected by the medical device. It should be appreciated that the medical device (e.g., the processing unit 22) may only receive a signal from and/or monitor the output of the comparator. That is, the obtained analog cardiac signal is not directly applied to the processing unit 22. As discussed above, in some instances, the comparator trips 1406 may each be separated by approximately 4 ms.

In the illustrated analog cardiac signal 1402 shown in FIG. 14, during the R-wave 1404, a total of 12 comparator trips are detected. It will be appreciated that, in other instances, more or less comparator trips will be detected based on the amplitude of the analog cardiac signal and the gain level applied to the analog cardiac signal. As discussed above, in some instances, the medical device is configured to detect the patient's heartbeat (and thus switch from the ready state 704 into the refractory state 706) after three valid comparator trips. Because the first detected comparator trip was not within the detection time period threshold (e.g., 20 ms) of a preceding comparator trip, it is not considered a valid comparator trip. Accordingly, the medical device detects the patient's heartbeat upon detection of the fourth comparator trip (i.e., the third valid comparator trip) and switches into the refractory state 706. Once in the refractory state 706, the medical device is configured to remain in the refractory state 706 until the refractory period (e.g., 290 ms) has expired.

Figure 15:
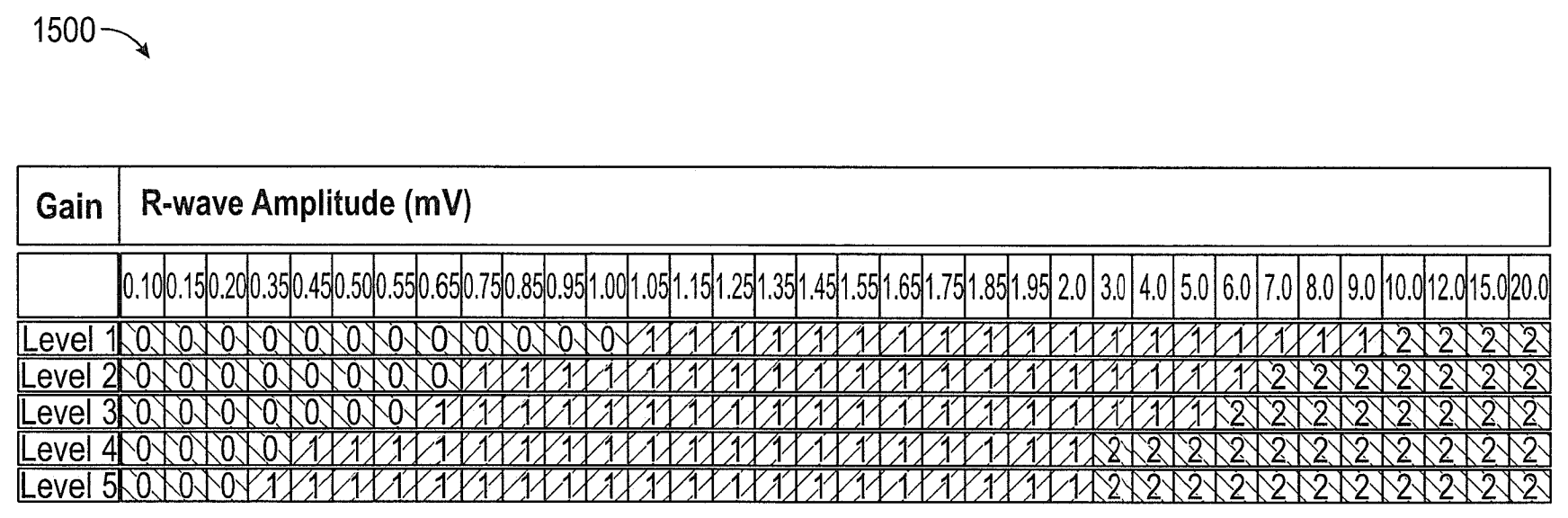

Referring now to FIG. 15, a chart 1500 depicting heartbeat detections at various R-wave amplitudes and gain levels is shown, according to one embodiment of the present disclosure. In the chart 1500, for each gain level and R-wave amplitude, a value of "0," "1," or "2" is provided. A "0" indicates that, at the corresponding gain level and R-wave amplitude, no heartbeat was detected. A "1" indicates that, at the corresponding gain level and R-wave amplitude, the heartbeat was properly detected. A "2" indicates that, at the corresponding gain level and R-wave amplitude, a double detection occurred.

As can be seen, at a first gain level (i.e., "level 1"), which is the lowest available gain level, the medical device is configured to properly detect heartbeats having R-wave amplitudes between 1 mV and 8 mV. However, the first gain level under-senses (i.e., fails to properly detect) heartbeats having R-wave amplitudes below 1 mV and over-senses (i.e., double detects) heartbeats having R-wave amplitudes over 8 mV. On the other hand, at a fifth gain level (i.e., "level 5"), which is the highest available gain level, the medical device is configured to properly detect heartbeats having R-wave amplitudes between 0.25 mV and 2 mV. However, the fifth gain level under-senses heartbeats having R-wave amplitudes below 0.25 mV and over-senses heartbeats having R-wave amplitudes over 2.0 mV.

Accordingly, by utilizing the AGC algorithm described herein to automatically switch between a plurality of different gain levels or settings having varying R-wave amplitude ranges within which the patient's heartbeat is properly detected, the medical device is configured to ensure proper detection of heartbeats across a wide range of R-wave amplitudes. It should be appreciated that, although five different gain levels or settings are depicted in FIG. 15, in other embodiments, more or less than five different gain levels or settings may be utilized by the AGC algorithm, as desired for a given application. For example, in some instances, only three different gain levels or settings (e.g., minimum, medium, maximum) may be utilized by the AGC algorithm. In some instances, utilizing a reduced number of gain levels or settings may reduce the computational requirements placed on the AGC algorithm (e.g., by eliminating various corresponding thresholds and comparisons). Thus, utilizing a reduced number of gain levels may also reduce an overall power consumption of the medical device during use.

Further, it should be appreciated that, in some instances, the R-wave amplitude ranges of one or more of the different gain levels or settings may overlap, such that a patient's heartbeat at a given R-wave amplitude may be properly detected using more than one of the potential gain levels or settings utilized by the AGC algorithm. This downsizing of selectable gain levels or settings may be particularly beneficial in the context of implantable medical devices, which are generally difficult to recharge and/or replace once implanted.

Figure 16:
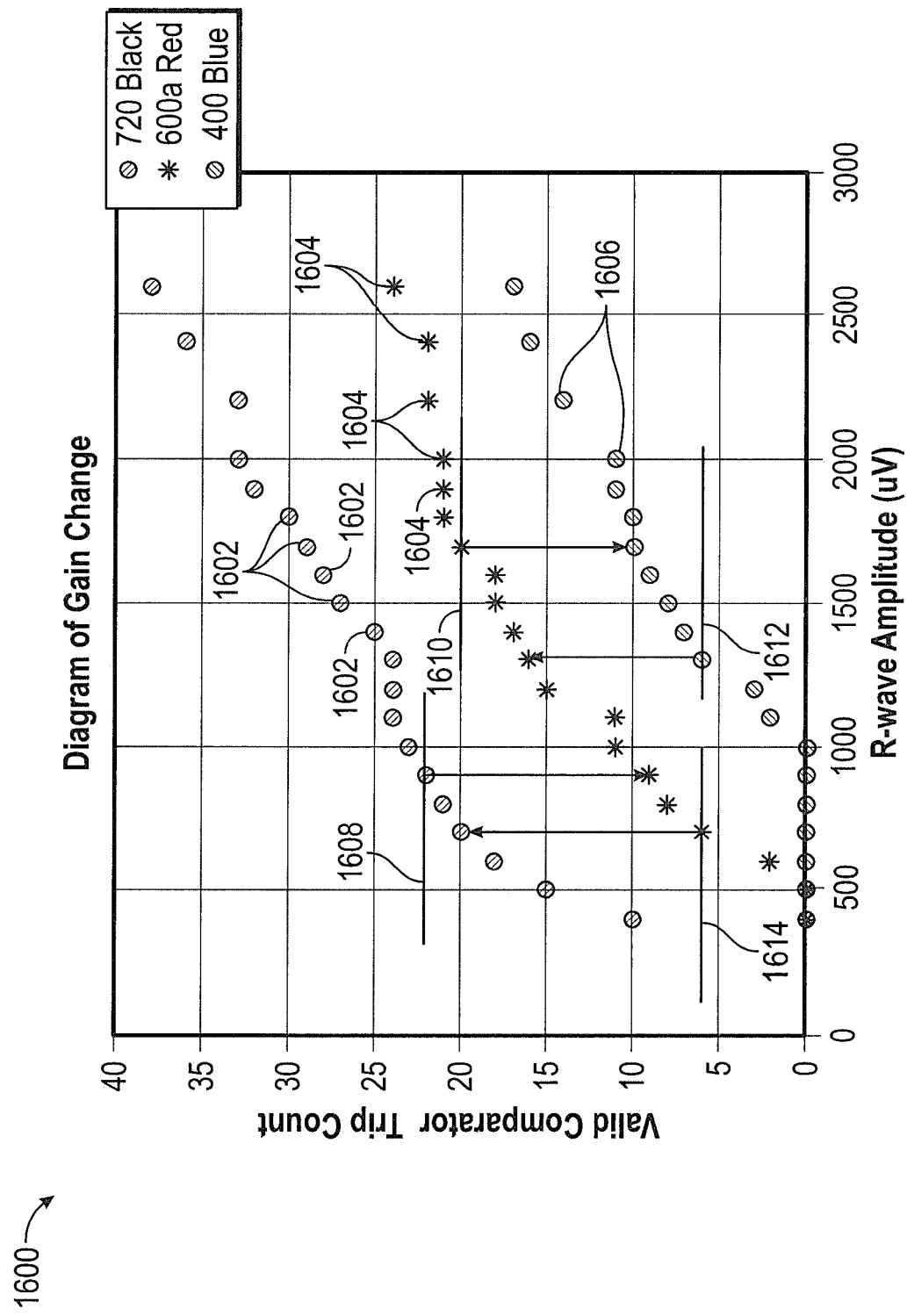
FIG. 16 is chart of valid comparator trip counts for various R-wave amplitudes depicting various gain setting changes, according to an exemplary embodiment.

Referring now to FIG. 16, a chart 1600 of valid comparator trip counts for a maximum gain level 1602, a medium gain level 1604, and a minimum gain level 1606 at various R-wave amplitudes is shown, according to one embodiment of the present disclosure. As depicted, when the medical device is set to the maximum gain level 1602, as the R-wave amplitude increases from a low R-wave amplitude (e.g., 500 μV), a corresponding valid comparator trip count for the maximum gain level 1602 gradually increases. Once the valid comparator trip count for the maximum gain level 1602 rises above a maximum gain decrease threshold 1608 (e.g., 22 valid comparator trips), the medical device is configured to lower the gain level, as described above, to the medium gain level 1604, which has a lower valid comparator trip count for the same R-wave amplitude.

When the medical device is set to the medium gain level 1604, as the R-wave amplitude continues to increase, the corresponding valid comparator trip count for the medium gain level 1604 again gradually increases. Once the valid comparator trip count for the medium gain level 1604 rises above a medium gain decrease threshold 1610 (e.g., 20 valid comparator trips), the medical device is configured to lower the gain level again, as described above, to the minimum gain level 1606, which similarly has a lower valid comparator trip count for the same R-wave amplitude.

As illustrated in FIG. 16, when the medical device is set to the minimum gain level 1606, as the R-wave amplitude decreases from a high R-wave amplitude (e.g., 2500 µV), a corresponding valid comparator trip count for the minimum gain level 1606 gradually decreases. Once the valid comparator trip count for the minimum gain level 1606 drops below a minimum gain increase threshold 1612 (e.g., six valid comparator trips), the medical device is configured to raise the gain level, as described above, to the medium gain level 1604, which has a higher valid comparator trip count for the same R-wave amplitude.

When the medical device is set to the medium gain level 1604, as the R-wave amplitude continues to decrease, the corresponding valid comparator trip count for the medium gain level 1604 again gradually decreases. Once the valid comparator trip count for the medium gain level 1604 drops below a medium gain increase threshold 1614 (e.g., six valid comparator trips), the medical device is configured to raise the gain level again, as described above, to the maximum gain level 1602, which similarly has a higher valid comparator trip count for the same R-wave amplitude.

Accordingly, during operation, the medical device is configured to continuously adjust the gain level applied to the analog cardiac signal based on the valid comparator trip count using the AGC algorithm described herein to maintain the valid comparator trip count within a range selected to ensure proper detection (e.g., by avoiding under-sensing and over-sensing) of the patient's heartbeat. As described above, the various flag count thresholds (e.g., the gain increase flag count threshold and the gain decrease flag count threshold) may provide an effective hysteresis mechanism within the AGC algorithm, such that the frequency of gain oscillation is reduced. This reduction in gain oscillation may further reduce the computational burden placed on the medical device, thereby further reducing the power consumption of the medical device, as opposed to an AGC algorithm that does not include the various flag count thresholds described herein.

Figure 17:
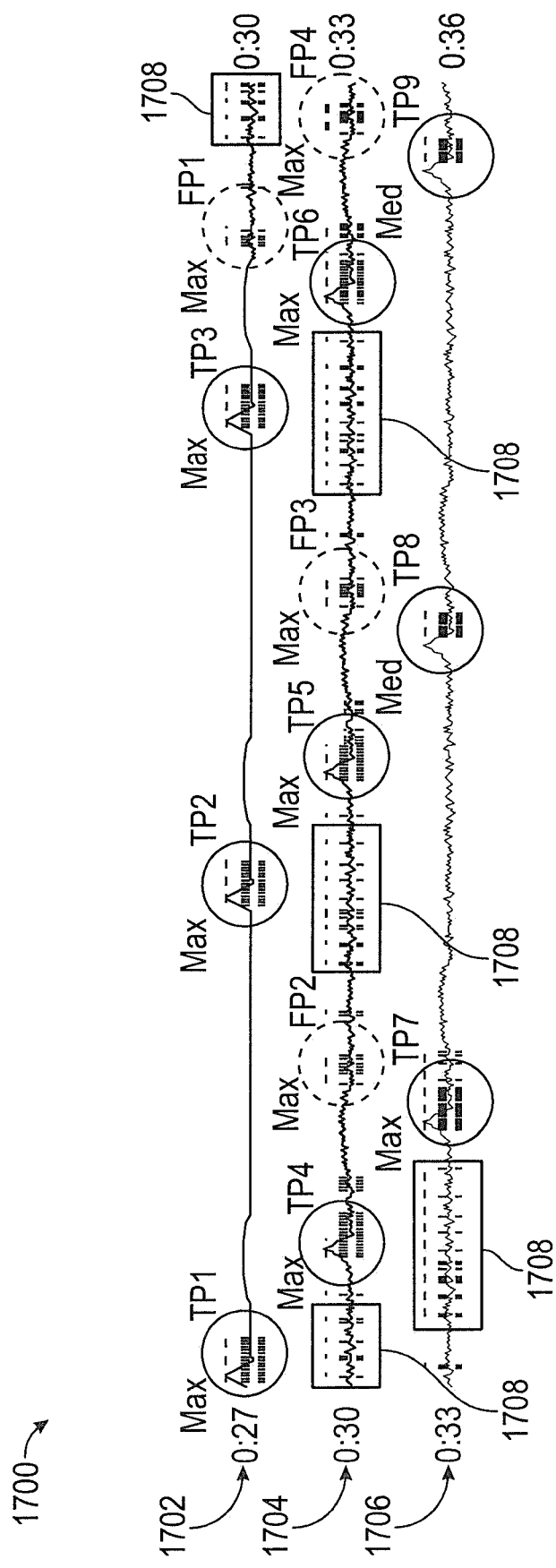
FIG. 17 is an illustrative graphic of a cardiac signal depicting true and false heartbeat detections, according to an exemplary embodiment.

Referring now to FIG. 17, a graphical depiction 1700 of a simulated cardiac signal being monitored for heartbeat detection by a medical device using the methods described herein is shown, according to one embodiment of the present disclosure. The simulated cardiac signal has an R-wave amplitude of approximately 1.2 mV, a QRS duration of 120 ms, and a T-Wave amplitude approximately 25% as large as the R-wave (e.g., 0.3 mV).

In the illustrated example provided in the FIG. 17, the graphical depiction 1700 shows the medical device determining that a double detection has occurred and subsequently lowering the gain, in accordance with certain aspects of the AGC algorithm described herein. However, it will be appreciated that, in other instances, the AGC algorithm is configured to modify or adjust the gain level applied to the cardiac signal in a variety of other manners, as described in detail above.

For example, the simulated cardiac signal comprises a first cardiac signal period 1702, a second cardiac signal period 1704, and a third cardiac signal period 1706. It should be appreciated that the first, second, and third cardiac signal periods 1702, 1704, 1706 are consecutive portions of the simulated cardiac signal. The simulated cardiac signal further includes various true positive heartbeat detections (TP1-TP9), false positive heartbeat detections (FP1-FP4), and invalid comparator trip events 1708. As illustrated, the simulated cardiac signal is noise-free for the first three heartbeats and is then noise contaminated with 12 dB of noise contamination. Throughout the simulated cardiac signal, a plurality of vertical lines (with corresponding dots above each vertical line) are also shown, which each signify a corresponding comparator trip.

During the first cardiac signal portion 1702, the medical device is initially set to a maximum gain setting (signified by "Max" throughout FIG. 17). As shown, the medical device accurately detects the first three simulated heartbeats (i.e., true positive detections TP1-TP3), while the simulated cardiac signal is noise-free. Specifically, because each of the first three simulated heartbeats have more than three clustered valid comparator trips (e.g., 22 clustered valid comparator trips), the medical device identifies each of the simulated heartbeats as detected heartbeats. Because these detected heartbeats are associated with actual simulated heartbeats, these detected heartbeats are considered "true positive detections."

However, once the simulated cardiac signal is noise contaminated after the third true positive detection TP3, the medical device proceeds to then falsely detect a heartbeat (i.e., false positive detection FP1), detect a first invalid comparator trip event 1708 (e.g., between false positive detection FP1 and true positive detection TP4), and then detect another true positive detection TP4.

Specifically, because the simulated cardiac signal at FP1 has more than three clustered valid comparator trips (e.g., 10 clustered valid comparator trips), the medical device identifies this event as a detected heartbeat. However, because this detected heartbeat is not associated with an actual simulated heartbeat, this detected heartbeat is considered a "false positive detection." During the first invalid comparator trip event 1708, although there are several detected comparator trips, the comparator trips are isolated, and thus either fail to constitute "valid" comparator trips or are not "clustered," as discussed above. Accordingly, the medical device does not identify these comparator trips as a detected heartbeat. The true positive detection TP4 is detected as described above, with respect to TP1-TP3.

As depicted by false positive detections FP2-FP4, second through fourth invalid comparator trip events 1708 (e.g., between false positive detections FP2-FP4 and true positive detections TP5-TP7, respectively), and true positive detections TP5-TP7, the medical device identifies the same pattern of a false positive detection followed by an invalid comparator trip event, followed by a positive trip detection three more times. At true positive detection TP7, the medical device determines that the valid comparator trip count associated with the true positive detection TP7 is greater than the double detection threshold (e.g., above 20 valid comparator trips).

Accordingly, upon determining that the true positive detection TP7 is greater than the double detection threshold, the medical device proceeds to determine if the criteria for a double detection is met. For example, the medical device compares the valid comparator count associated with the true positive detection TP7 with the valid comparator counts associated with each of false positive detections FP1-FP4 and true positive detections TP4-TP6 (e.g., the previous seven heartbeat detections) to determine whether approximately half (e.g., three or four of the eight detected heart beats) had a number of valid comparator trips that were less than a threshold percentage (e.g., 50%) of the number of valid comparator trips associated with the true positive detection TP7 while approximately half e.g., three or four of the eight detected heart beats) had a number of valid comparator trips that were more than a threshold percentage (e.g., 50%) of the number of valid comparator trips associated with the true positive detection TP7.

For example, in the illustrated example provided in FIG. 17, the true positive detection TP7 has 37 valid comparator trips. Meanwhile, each of true positive detections TP4-TP6 have a similar number of valid comparator trips (i.e., above 50%), while each of the false positive detections FP1-FP4 have 10 valid comparator trips (i.e., below 50%). Accordingly, after the true positive detection TP7, the medical device determines that the double detection criteria has been met and subsequently lowers the gain level applied to the cardiac signal to the medium level (signified by "Med" in FIG. 17).

As illustrated, once the gain level has been lowered to the medium gain level, the medical device does not detect any more false positive detections or invalid comparator trip events and proceeds to accurately detect true positive detections TP8, TP9. For example, each of the true positive detections TP8, TP9 have associated valid comparator trip counts of 12 comparator trip counts and are accordingly identified as heartbeats within the simulated cardiac signal.

Accordingly, the systems, devices, and methods described herein provide an AGC algorithm configured to automatically adjust the gain level applied to a cardiac signal obtained from a patient to ensure proper and/or accurate detection of the patient's heartbeat. In some instances, the AGC algorithm may be capable of providing proper and/or accurate detection of the patient's heartbeat for patient cardiac signals having an R-wave, peak-to-peak amplitude within at least a range of 0.4 mV to 2.0 mV, a T-wave amplitude that is as high as or higher than 50% of the corresponding QRS amplitude, and a QRS duration within at least a range of 59 ms to 109 ms. In some instances, the AGC algorithm is further capable of providing proper and/or accurate detection of the patient's heartbeat over at least a range of 28 to 200 beats per minute. In some instances, the AGC algorithm is further capable of providing proper and/or accurate detection of the patient's heartbeat when a signal-to-noise ratio of the cardiac signal is as high as or higher than 12 dB.

Although the AGC algorithm described herein has generally been described in the context of implantable medical devices for use in drug-refractory epilepsy treatment and/or chronic heart failure treatment, it should be appreciated that the AGC algorithm can be used in a variety of devices for a variety of patient monitoring and/or treatment processes. That is, the benefits of the AGC algorithm described herein are not limited to implantable medical devices, drug-refractory epilepsy treatment, and/or chronic heart failure treatment, but instead apply generally to any of a variety of devices, systems, and/or methods for detecting a patient's heartbeat via an obtained patient cardiac signal. Accordingly, it should be appreciated that the utilization of the AGC algorithm within any of these other devices, systems, and/or methods is contemplated by the present disclosure.

While the invention has been particularly shown and described as referenced to the embodiments thereof, those skilled in the art will understand that the foregoing and other changes in form and detail may be made therein without departing from the spirit and scope. For example, in various embodiments described above, the stimulation is applied to the vagus nerve. Alternatively, spinal cord stimulation (SCS) may be used in place of or in addition to vagus nerve stimulation for the above-described therapies. SCS may utilize stimulating electrodes implanted in the epidural space, an electrical pulse generator implanted in the lower abdominal area or gluteal region, and conducting wires coupling the stimulating electrodes to the generator.

What is claimed is:

1. An implantable medical device comprising:
   a control circuit; and
   a memory operably coupled to the control circuit and comprising instructions that, when executed by the control circuit, cause the control circuit to:
      monitor an output of at least one comparator, the output of the at least one comparator being responsive to a cardiac signal of a patient;
      detect a plurality of comparator trips associated with an individual heartbeat of the patient within the monitored output of the at least one comparator; and
      automatically adjust a gain level applied to the cardiac signal over time based at least in part on a comparison between the plurality of comparator trips to a gain adjustment threshold comprising a threshold number of comparator trips.

2. The implantable medical device of claim 1, wherein the control circuit is configured to detect the individual heartbeat of the patient based on the monitored output of the at least one comparator and to switch between a ready state and a refractory state based on the individual heartbeat of the patient.

3. The implantable medical device of claim 2, wherein, in the refractory state, the control circuit is configured to:
   validate the plurality of comparator trips as a plurality of valid comparator trips associated with the individual heartbeat of the patient, the plurality of valid comparator trips being a plurality of indications from the at least one comparator that an amplitude of the cardiac signal of the patient has one of exceeded or dropped below a predetermined threshold, wherein validating the plurality of valid comparator trips comprises determining a number of valid comparator trips; and
   compare the number of valid comparator trips to the gain adjustment threshold,
   wherein adjusting the gain level is based on the comparison of the number of valid comparator trips to the gain adjustment threshold.

4. The implantable medical device of claim 3, wherein the gain adjustment threshold is based on the gain level applied to the cardiac signal and is one of a gain increase threshold or a gain decrease threshold.

5. The implantable medical device of claim 2, wherein, in the ready state, the control circuit is configured to:
   detect, based on the output of the at least one comparator, the individual heartbeat of the patient; and
   upon detection of the individual heartbeat of the patient, switch to the refractory state.

6. The implantable medical device of claim 5, wherein detecting the individual heartbeat of the patient comprises:

detecting a comparator trip of the at least one comparator, the comparator trip being an indication from the at least one comparator that an amplitude of the cardiac signal of the patient has one of exceeded or dropped below a predetermined threshold;

determining a time period between the comparator trip and a previous comparator trip;

determining that the comparator trip is a valid comparator trip based on the time period being below a detection time period threshold; and incrementing a valid comparator trip count associated with the individual heartbeat of the patient.

7. The implantable medical device of claim 6, wherein detecting the individual heartbeat of the patient further comprises:

determining that the valid comparator trip is clustered with at least one previous valid comparator trip, and wherein detecting the individual heartbeat of the patient is based on the determination that the valid comparator trip is clustered with the at least one previous valid comparator trip.

8. The implantable medical device of claim 2, wherein, in the ready state, the control circuit is configured to:

determine an amount of time elapsed since a previous detected heartbeat of the patient; and determine that the amount of time elapsed exceeds a timeout threshold, wherein adjusting the gain level comprises increasing the gain level based on the determination that the amount of time elapsed exceeds the timeout threshold.

9. The implantable medical device of claim 2, wherein, in the refractory state, the control circuit is configured to:

perform a double detection analysis comprising:

validating the plurality of comparator trips as a plurality of valid comparator trips associated with the individual heartbeat of the patient, wherein validating the plurality of valid comparator trips comprises determining a number of valid comparator trips;

comparing the number of valid comparator trips to a double detection threshold;

upon determining that the number of valid comparator trips exceeds the double detection threshold, compare the number of valid comparator trips associated with the individual heartbeat of the patient with at least one previous number of valid comparator trips associated with at least one previous heartbeat of the patient; and identify a double detection based on the comparison of the number of valid comparator trips and the at least one previous number of valid comparator trips, and wherein adjusting the gain level is based on the identified double detection.

10. A method of operating an implantable medical device, the method comprising:

monitoring an output of at least one comparator, the output of the at least one comparator being responsive to a cardiac signal of a patient;

detecting a plurality of comparator trips associated with an individual heartbeat of the patient within the monitored output of the at least one comparator; and automatically adjusting a gain level applied to the cardiac signal over time based at least in part on a comparison between the plurality of comparator trips to a gain adjustment threshold comprising a threshold number of comparator trips.

11. The method of claim 10, further comprising:

detecting, based on the monitored output of the at least one comparator, the individual heartbeat of the patient based on the monitored output of the at least one comparator and switching between a ready state and a refractory state based on the individual heartbeat of the patient.

12. The method of claim 11, further comprising:

validating the plurality of comparator trips as a plurality of valid comparator trips associated with the individual heartbeat of the patient, the plurality of valid comparator trips being a plurality of indications from the at least one comparator that an amplitude of the cardiac signal of the patient has one of exceeded or dropped below a predetermined threshold, wherein validating the plurality of valid comparator trips comprises determining a number of valid comparator trips; and comparing the number of valid comparator trips to the gain adjustment threshold, wherein adjusting the gain level is based on the comparison of the number of valid comparator trips to the gain adjustment threshold.

13. The method of claim 11, wherein detecting the individual heartbeat of the patient comprises:

detecting a comparator trip of the at least one comparator, the comparator trip being an indication from the at least one comparator that an amplitude of the cardiac signal of the patient has one of exceeded or dropped below a predetermined threshold;

determining a time period between the comparator trip and a previous comparator trip;

determining that the comparator trip is a valid comparator trip based on the time period being below a detection time period threshold; and incrementing a valid comparator trip count associated with the individual heartbeat of the patient.

14. The method of claim 13, wherein detecting the individual heartbeat of the patient further comprises:

determining that the valid comparator trip is clustered with at least one previous valid comparator trip, and wherein detecting the individual heartbeat of the patient is based on the determination that the valid comparator trip is clustered with the at least one previous valid comparator trip.

15. The method of claim 10, further comprising:

determining an amount of time elapsed since a previous detected heartbeat of the patient; and determining that the amount of time elapsed exceeds a timeout threshold, wherein adjusting the gain level comprises increasing the gain level based on the determination that the amount of time elapsed exceeds the timeout threshold.

16. A non-transitory computer-readable medium comprising instructions executable by a processor to:

monitor an output of at least one comparator, the output of the at least one comparator being responsive to a cardiac signal of a patient;

detect a plurality of comparator trips associated with an individual heartbeat of the patient within the monitored output of the at least one comparator; and automatically adjust a gain level applied to the cardiac signal over time based at least in part on a comparison between the plurality of comparator trips to a gain adjustment threshold comprising a threshold number of comparator trips.

17. The non-transitory computer-readable medium of claim 16, wherein the instructions are further executable by the processor to:
  detect, based on the output of the at least one comparator, the individual heartbeat of the patient and switch between a ready state and a refractory state based on the individual heartbeat of the patient.

18. The non-transitory computer-readable medium of claim 17, wherein the instructions are further executable by the processor to:
  validate the plurality of comparator trips as a plurality of valid comparator trips associated with the individual heartbeat of the patient, the plurality of valid comparator trips being a plurality of indications from the at least one comparator that an amplitude of the cardiac signal of the patient has one of exceeded or dropped below a predetermined threshold, wherein validating the plurality of valid comparator trips comprises determining a number of valid comparator trips; and
  compare the number of valid comparator trips to the gain adjustment threshold,
  wherein adjusting the gain level is based on the comparison of the number of valid comparator trips to the gain adjustment threshold.

19. The non-transitory computer-readable medium of claim 17, wherein detecting the individual heartbeat of the patient comprises:
  detecting a comparator trip of the at least one comparator, the comparator trip being an indication from the at least one comparator that an amplitude of the cardiac signal of the patient has one of exceeded or dropped below a predetermined threshold;
  determining a time period between the comparator trip and a previous comparator trip;
  determining that the comparator trip is a valid comparator trip based on the time period being below a detection time period threshold; and
  incrementing a valid comparator trip count associated with the individual heartbeat of the patient.

20. The non-transitory computer-readable medium of claim 19, wherein detecting the individual heartbeat of the patient further comprises:
  determining that the valid comparator trip is clustered with at least one previous valid comparator trip, and
  wherein detecting the individual heartbeat of the patient is based on the determination that the valid comparator trip is clustered with the at least one previous valid comparator trip.

* * * * *